US 7,099,673 B2

(12) United States Patent
Yamashita

(10) Patent No.: US 7,099,673 B2
(45) Date of Patent: Aug. 29, 2006

(54) MOBILE COMMUNICATION SYSTEM, AND A RADIO BASE STATION, A RADIO APPARATUS AND A MOBILE TERMINAL

(75) Inventor: Atsushi Yamashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 421 days.

(21) Appl. No.: 10/043,815

(22) Filed: Jan. 11, 2002

(65) Prior Publication Data
US 2003/0064729 A1 Apr. 3, 2003

(30) Foreign Application Priority Data
Aug. 27, 2001 (JP) ............................. 2001-256952

(51) Int. Cl.
H04Q 7/20 (2006.01)
H04B 7/01 (2006.01)
(52) U.S. Cl. .................. 455/452.2; 455/504; 455/444; 455/441
(58) Field of Classification Search ................ 455/441, 455/436, 67.11, 67.16, 504, 506, 67.13, 135, 455/115.3, 447, 423, 450, 452.2, 444, 34.1, 455/33; 370/347, 343, 328, 331, 337, 330; 342/457
See application file for complete search history.

(56) References Cited

U.S. PATENT DOCUMENTS

| 5,396,645 | A | * | 3/1995 | Huff | 455/441 |
| 5,548,806 | A | * | 8/1996 | Yamaguchi et al. | 455/441 |
| 5,920,819 | A | * | 7/1999 | Asanuma | 455/447 |
| 6,014,566 | A | * | 1/2000 | Owada | 455/444 |
| 6,160,801 | A | * | 12/2000 | Uchida et al. | 370/337 |
| 6,212,381 | B1 | * | 4/2001 | Oda | 455/441 |
| 6,256,500 | B1 | * | 7/2001 | Yamashita | 455/441 |
| 6,272,325 | B1 | * | 8/2001 | Wiedeman et al. | 455/117 |
| 6,400,953 | B1 | * | 6/2002 | Furukawa | 455/442 |
| 6,434,130 | B1 | * | 8/2002 | Soininen et al. | 370/331 |
| 6,628,958 | B1 | * | 9/2003 | Kamel et al. | 455/522 |
| 6,708,042 | B1 | * | 3/2004 | Hayakawa | 455/522 |
| 6,760,882 | B1 | * | 7/2004 | Gesbert et al. | 714/774 |

FOREIGN PATENT DOCUMENTS

| JP | 5259969 | 10/1993 |
| JP | 6069859 | 3/1994 |
| JP | 6242225 | 9/1994 |
| JP | 7023458 | 1/1995 |
| JP | 10023502 | 1/1998 |
| WO | WO 96/06490 | 2/1996 |

OTHER PUBLICATIONS

A.J. Viterbi, CDMA Principles of Spread Spectrum Communication. Addison-Wesley, 1995.

(Continued)

Primary Examiner—George Eng
Assistant Examiner—Kiet Doan
(74) Attorney, Agent, or Firm—Karren Muchin Rosenman LLP

(57) ABSTRACT

A mobile communication system comprises a detecting unit to detect information concerning a moving speed of a mobile terminal, and a selection controlling unit to select a use frequency in a higher frequency band when the speed information detected by the detecting unit is a higher speed, while selecting the use frequency in a lower frequency band when the detected information is a lower speed, and assigning it to the mobile terminal. In a mobile communication system in which a relationship between a terminal moving speed (Doppler frequency) and transmission quality degradation is non-monotonous, the communication quality can be improved and the channel capacity can be increased.

20 Claims, 12 Drawing Sheets

OTHER PUBLICATIONS

R. Padovani, Reverse Link Performance of IS-95 Based Cellular Systems, IEEE Personal Communications, pp. 28-34, 1994.

Okumura et al. Fundamentals of Mobile Communications. The Institute of Electronics Information and Communication Engineers pp. 36-77, 1986.

A.J. Viterbi et al., Other-Cell Interference in Cellular Power-Controlled CDMA. IEEE Transactions on Communications, vol. 42, No. 2/3/4, pp. 1501-1504, Feb., Mar., Apr. 1994.

A.J. Viterbi et al. Soft-Handoff Extends CDMA Cell Coverage and Increases Reverse Link Capacity. IEEE Journal on Selected Areas in Communications, vol. 12, No. 8, pp. 1281-1288, Oct. 1994.

* cited by examiner

MOBILE COMMUNICATION SYSTEM, AND A RADIO BASE STATION, A RADIO APPARATUS AND A MOBILE TERMINAL

BACKGROUND OF THE INVENTION (1) Field of the Invention

The present invention relates to a mobile communication system, and a radio station and a mobile terminal. Particularly, the present invention relates to a technique suitable for use in mobile communications in which communication is carried out in code division multiple access (CDMA).

(2) Description of Related Art

CDMA is widely used as a mobile communication system. Frequency division multiple access (FDMA) or time division multiplex access (TDMA) is basically a system operated under conditions without interference between subscribers since it assigns resources (frequencies, time or the like) orthogonal to one another to subscribers (mobile terminals such as portable telephones or the like). On the other hand, CDMA is operated under conditions that subscribers are interfered with each other, thus being a system the channel capacity of which is expected to be improved by the statistical multiplexing effect.

Since the CDMA communication system is operated under conditions that signals of subscribers are interfered with each other as above, transmission power control (TPC) or forward error correction (FEC) or the like is used to control a transmitting signal power of each subscriber to be the minimum requirement, minimize the interference between them, thereby to maximize the channel capacity.

It is said that the channel capacity of a CDMA communication system is generally calculated by the following equation (1) (reference 1; A. Viterbi, CDMA Principles of Speed Spectrum Communication Addison-Wesley, (1995)):

$$N \approx \frac{pg}{Eb/No\_th \times (fs + fo) \times d} \times Dt \times \frac{Gs}{Ns} \times Lf \quad (1)$$

In the above equation (1), N is a channel capacity (ch/sector/RF), pg is a processing gain, Eb/No_th is a required Eb/No, fs is a self-cell interference ratio, fo is an other-cell interference ratio, d is a voice activity factor, Dt is degradation due to a transmitting power control error, Gs is a sectorization effect, Ns is the number of sectors/cells, and Lf is a loading factor. Incidentally, the channel capacity is considered using the following equation (2), omitting parameters not relating to the discussion:

$$N \approx K \times \frac{pg}{Eb/No\_th \times (fs + fo)} \quad (2)$$

In the equation (2), K represents a factor of an effect of other parameter.

The equation (2) signifies that when a signal-to-(interference+noise)power ratio (required Eb/No) required to satisfy desired communication quality (hereinafter also referred as transmission quality) increases, a transmission power of each station increases, thus interference is increases, which leads to a decrease in channel capacity N.

CDMA is a system that optimizes the communication quality and the channel capacity by TPC and FEC. However, CDMA has a disadvantage that the required Eb/No is degraded at a specific terminal moving speed because of a difference in response speed between TPC and FEC (reference 2; R. Padovani, Reverse Link Performance of IS-95 Based Cellular Systems IEEE Personal Communications, Third Quarter, (1994)).

This phenomenon occurs as follows:

In the mobile communication, there occurs fading (Reyleigh fading) that propagation loss fluctuates due to mainly interference between reflections from objects around the terminal, which fluctuates at a speed according to a moving speed of the terminal. The fluctuating speed of Reyleigh fading is characterized by a Doppler frequency fD due to movement of the terminal as shown by the following equation (3) (reference 3; Okumura, Shinshi, "Fundamentals of Mobile Communications", The Institute of Electronics Information and Communication Engineers, (1986)):

$$fD \approx fR \times VM/C \quad (3)$$

where fR is a radio frequency, VM is a terminal moving speed and C is the speed of light.

It is seen that higher the radio frequency fR and faster the terminal moving speed VM, faster is the fluctuating speed of Reyleigh fading. Since the response speed is generally slow in TPC, it is possible to follow the propagation loss fluctuation due to fading to control the transmitting power when the Reyleigh fading fluctuation is slow (that is, when the Doppler frequency fD is low), thus degradation of the communication quality can be prevented. However, when the Doppler frequency (that is, the fading frequency) fD is high, the communication quality is degraded since TPC cannot follow the fading fluctuation.

On the other hand, it is possible to disperse an effect of burst signal power reduction due to fading by combining FEC with interleaving (IL). However, when the fading speed is slow, there occurs signal power reduction for such a long time that the signal power reduction cannot be corrected since the IL cycle is finite, which leads to degradation of the communication quality.

For this, there occurs a phenomenon that noticeable reduction of the communication quality at the intermediate frequency fD between the Doppler frequency fD at which an effect of improvement of the communication quantity by TPC is obtained and the Doppler frequency fD at which an effect of improvement by FEC is obtained (refer to FIG. 13 and the reference 2). FIG. 13 shows Eb/No required to satisfy the frame error rate (FER)=1% in a reverse link (mobile terminal to base station, 9.6 kbps) in an IS-95 system. When the radio frequency=850 MHz, fD=40 Hz corresponds to a mobile terminal moving speed=50.8 km/h, for example.

Since the terminal moving speed cannot be defined uniquely, the system has to be designed at the Doppler frequency at which the quality degradation is maximum [namely, the required Eb/No is maximum (in the example in FIG. 13, fD=47 Hz and the required Eb/No=6.1 dB)]. However, a large required Eb/No degrades the channel capacity N as expressed by the above equation (2). On the other hand, when the channel capacity N is secured, the required Eb/No cannot be satisfied, which leads to degradation of the communication quality.

In a system such as TDMA or FDMA in which the transmission quality monotonically degrades when the fading pitch (fD) increases, an attempt is made to prevent large degradation of the transmission quality of a specific terminal to equalize the communication quality in the entire system, thereby improving the overall performance, as disclosed in, for example, Japanese Patent Laid-Open Publication No. 5-259969.

In concrete, the technique disclosed in Japanese Patent Laid-Open Publication No. 5-259969 (hereinafter referred as known technique 1) accomplishes the above effect by a simple control based on only magnitude of the terminal moving speed on the assumption of monotonousness of the Doppler frequency fD and the transmission quality degradation that degradation of the transmission quality decreases when the fading pitch becomes smaller. However, such a simple control can provide only a small effect when degradation of the transmission quality to the Doppler frequency is non-monotonous as in CDMA (when there is employed a communication system having a characteristic that a required signal-to-noise power ratio of a received signal in a mobile terminal changes from a tendency to increase to a tendency to decrease according to the moving speed of the mobile terminal) which sometimes causes degradation of the communication quality in some cases.

Namely, the known technique 1 tries to assure the communication quality of a control channel by assigning a low frequency band to the control channel such that fD ($\propto$(moving speed)×(radio frequency)) of the control channel required a high communication quality becomes as low as possible. However, when the Doppler frequency fD is lowered in a system such as CDMA in which degradation of the transmission quality to the Doppler frequency fD is non-monotonous in the similar manner, there is a case where the communication quality degrades as with the case where FD>42 Hz in FIG. 13, for example.

The known technique 1 accommodates traffic of a high-speed mobile terminal in a low radio frequency band and a low-speed moving terminal in a high radio frequency band to equalize the Doppler frequency fD ($\propto$(moving speed)× (radio frequency)) as much as possible, thereby homogenizing the transmission quality to improve the overall performance.

In this method, when a radio frequency band in which the Doppler frequency brings about the worst value of the transmission quality (fD=42 Hz in the example in FIG. 13) is assigned, the transmission quality of the both terminals becomes the worst, thus the overall performance becomes the worst. The known technique 1 cannot prevent this.

The above problem is caused by that the known technique 1 performs a simple control based on only magnitude of the terminal moving speed on the assumption of monotonousness of the Doppler frequency fD and the transmission quality degradation.

In consideration of assignment of frequencies in a CDMA communication system, there is a technique disclosed in, for example, Japanese Patent Laid-Open Publication No. 10-23502 (hereinafter referred as known technique 2) as a known technique. An objective of the known technique 2 is to equalize the number of terminals to be accommodated in each radio frequency band (strictly, the number of radio channels to be used) in order to secure a channel for soft hand-off in the CDMA communication system.

However, the known technique 2 does not consider non-monotonousness or the like of the transmission quality to the terminal moving speed and the Doppler frequency fD, but assigns a radio frequency band without considering the terminal moving speed. For this, when the Doppler frequency fD brings about the worst value of the transmission quality at the assigned frequency (fD=42 Hz in the example in FIG. 13), large degradation occurs.

SUMMARY OF THE INVENTION

In the light of the above problems, an object of the present invention is to improve communication quality and increase a channel capacity in a mobile communication system in which a relationship between a terminal moving speed (Doppler frequency) and transmission quality degradation is non-monotonous.

The present invention therefore provides a mobile communication system comprising a detecting unit to detect information concerning a moving speed of the mobile terminal (hereinafter referred as a terminal moving speed) on the basis of a received signal from the mobile terminal, and a selection controlling unit to select the use frequency in a higher radio frequency band when the information detected by the detecting unit is higher, selecting the use frequency in a lower radio frequency band when the information is lower, and assigning the selected use frequency to the communication between the mobile terminal and the radio base station.

A radio base station according to this invention for realizing the above mobile communication system comprises:

(1) a radio communicating unit being able to communicate with the mobile terminal using any one of M (M being an integer not less than two) radio frequency bands;

(2) a speed information detecting unit to detect information concerning a moving speed of the mobile terminal (herein after referred as speed information) on the basis of a received signal from the mobile terminal received by the radio communicating unit; and (3) a use frequency selection controlling unit to select the use frequency in a higher radio frequency band when the speed information detected by the speed information detecting unit is higher, select the use frequency in a lower radio frequency band when the speed information is lower, and assign the selected use frequency to the communication with the mobile terminal.

By providing the above units to the radio base station, it is possible to switch the use radio frequency band at specific terminal moving speed information to improve the worst value of the required signal-to-noise power ratio.

A radio apparatus according to this invention being able to use both a frequency belonging to a first frequency band and a frequency belonging to a second frequency band higher than the first frequency band for communication on forward and reverse links with a mobile terminal, the radio apparatus comprising:

(1) a transmitting unit to convert a signal obtained by error-correction-encoding and interleave transmitting data into a radio signal, and transmit the radio signal for communication on the forward link to the mobile terminal;

(2) a transmitting power controlling unit to control a transmitting power of the radio signal for communication on the forward link on the basis of a received signal from the mobile terminal; and (3) a selection controlling unit to use a frequency belonging to the second frequency band for communication with the mobile terminal when determining that a fading cycle of the received signal from the mobile terminal or a moving speed of the mobile terminal is fast, use a frequency belonging to the first frequency band for communication with the mobile terminal when determining that the fading cycle or the moving speed of the mobile terminal is slow.

A radio apparatus according to this invention being able to use both a frequency belonging to a first frequency band and a frequency belonging to a second frequency band higher than the first frequency band for communication on forward and reverse links with a mobile terminal, the radio apparatus comprising:

(1) a transmitting unit to convert a signal obtained by encoding and interleaving transmitting data into a radio signal, and transmit the radio signal for communication on the forward link to the mobile terminal;

2) a transmitting power controlling unit to control a transmitting power of the radio signal for communication on the forward link on the basis of a received signal from the mobile terminal; and 3) a selection controlling unit to use a frequency belonging to the second frequency band in communication with the mobile terminal when determining on the basis of the received signal from the mobile terminal that a fading cycle in a received signal on the forward link received by the mobile terminal or a moving speed of the mobile terminal is fast, use a frequency belonging to the first frequency band in communication with the mobile terminal when determining that the fading cycle or the moving speed of the mobile terminal is slow.

A reference to determine whether a speed of the mobile terminal is fast or slow is determined on the basis of a required signal-to-noise power ratio of each of the above frequency bands. For example, when a communication system having a characteristic that the required signal-to-noise power ratio of a received signal in the terminal changes from a tendency to increase to a tendency to decrease according to a moving speed of the mobile terminal is employed, a terminal moving speed satisfying the required signal-to-noise power ratio of each frequency band may be the reference.

Since the above Doppler frequency fD is expressed by the above equation (3), the Doppler frequency fD changes according to the use radio frequency even at the same terminal moving speed, thus the required signal-to-noise power ratio changes. Therefore, a terminal moving speed at which the required signal-to-noise power ratio is maximum differs from use radio frequency to use radio frequency. However, the use radio frequency band is switched at a specific terminal moving speed as a boundary, the worst value of the required signal-to-noise power ratio can be improved.

Since the channel capacity of mobile communication depends on not only a required signal-to-noise power ratio but also interference power information such as a self-cell interference ratio (fs), an other-cell interference ratio (fo) or the like as shown by the equation (2), it is desirable that a selection (switching) reference (threshold value information) for the use radio frequency band is determined, adding interference power information to the communication with the mobile terminal.

In such case, if the above interference power information is determined on the basis of a signal transmission characteristic of each of the above radio frequency bands, it is possible to determine the above reference (threshold value information), considering fluctuation in radio wave propagation loss and the like, for example.

A mobile terminal according to this invention for realizing the above mobile communication system comprising:

1) a radio communicating unit being able to communicate with the radio base station using any one of M (M being an integer not less than two) radio frequency bands;

2) a selected frequency notification signal receiving unit to receive, from the radio communicating unit, a selected frequency notification signal for notifying of a use frequency selected among higher radio frequency bands in the radio base station when speed information of its own is faster or selected among lower radio frequency bands when the speed information of its own is slower; and 3) a use frequency selection controlling unit to select a radio frequency to be used in the radio communicating unit among the radio frequency bands according to the selected frequency notification signal received by the selected frequency notification signal receiving unit.

With the above structure, the mobile terminal according to this invention selects a radio frequency to be used in the communication with the radio base station in each of the above radio frequency bands according to the selected frequency notification signal for notifying of the radio frequency selected as above in the radio base station, thereby improving the worst value of the required signal-to-noise power ratio and the channel capacity in the whole system.

The present invention provides the following advantages and effects:

1) As a radio frequency to be used (assigned) in the communication between the radio base station (radio apparatus) and the mobile terminal, the use frequency is selected in a higher radio frequency band when the speed information concerning a moving speed of the mobile terminal is higher, while the use frequency is selected in a lower radio frequency band when the speed information is lower. It is thus possible to improve the worst value of the required signal-to-noise power ratio in a mobile communication system in which a relationship between the Doppler frequency and transmission quality degradation is non-monotonous (employing a communication system having a characteristic that the required signal-to-noise power ratio of a received signal in the mobile terminal changes from a tendency to increase to a tendency to decrease according to a moving speed of the mobile terminal), improve the communication quality, and increase the channel capacity.

2) When the threshold value information for the speed information that is a reference (boundary) between the above higher speed and lower speed is determined adding interference power information to the communication with the mobile terminal, threshold value information meeting actual communication environments can be obtained, which leads to further improvement of the communication quality and channel capacity.

3) If the above interference power information is determined on the basis of a signal transmission characteristic of each of plural radio frequency bands, it is possible to determine the above threshold value in consideration of fluctuation in radio wave propagation loss and the like. Accordingly, improvement of the worst value of the required signal-to-noise power ratio may bring more effects of improvement of the channel capacity.

4) The above interference power information may be calculated on the basis of information on the number of mobile terminals presently in communication and an actual measured value of the received signal-to-noise power. In such case, even if the interference power information fluctuates due to fluctuation in system operational environments, fluctuation in base station installation conditions or fluctuation in traffic with time, optimal threshold value information can be re-calculated following the fluctuation. It is therefore possible to appropriately switch the frequency in consideration of fluctuation in actual system operational environments, in base station installation conditions, in traffic with time and the like. Accordingly, a large improvement of the communication quality and a large increase in channel capacity are expected.

5) The above threshold value information may be prepared (2×M−1) pieces, and the use radio frequency may be selected on the basis of information on which range of the threshold value information speed information on the mobile terminal falls in, and priority information defining which radio frequency band should be used in each of the plural terminal speed ranges defined by each piece of the threshold value information. In such case, it is possible to alleviate concentration of calls in a specific radio frequency band without causing degradation of the worst value of the required signal-to-noise power ratio.

DESCRIPTION OF THE PREFERRED EMBODIMENTS

Hereinafter, description will be made of embodiments of this invention with reference to the drawings.

(A) Description of an Embodiment

Figure 1:
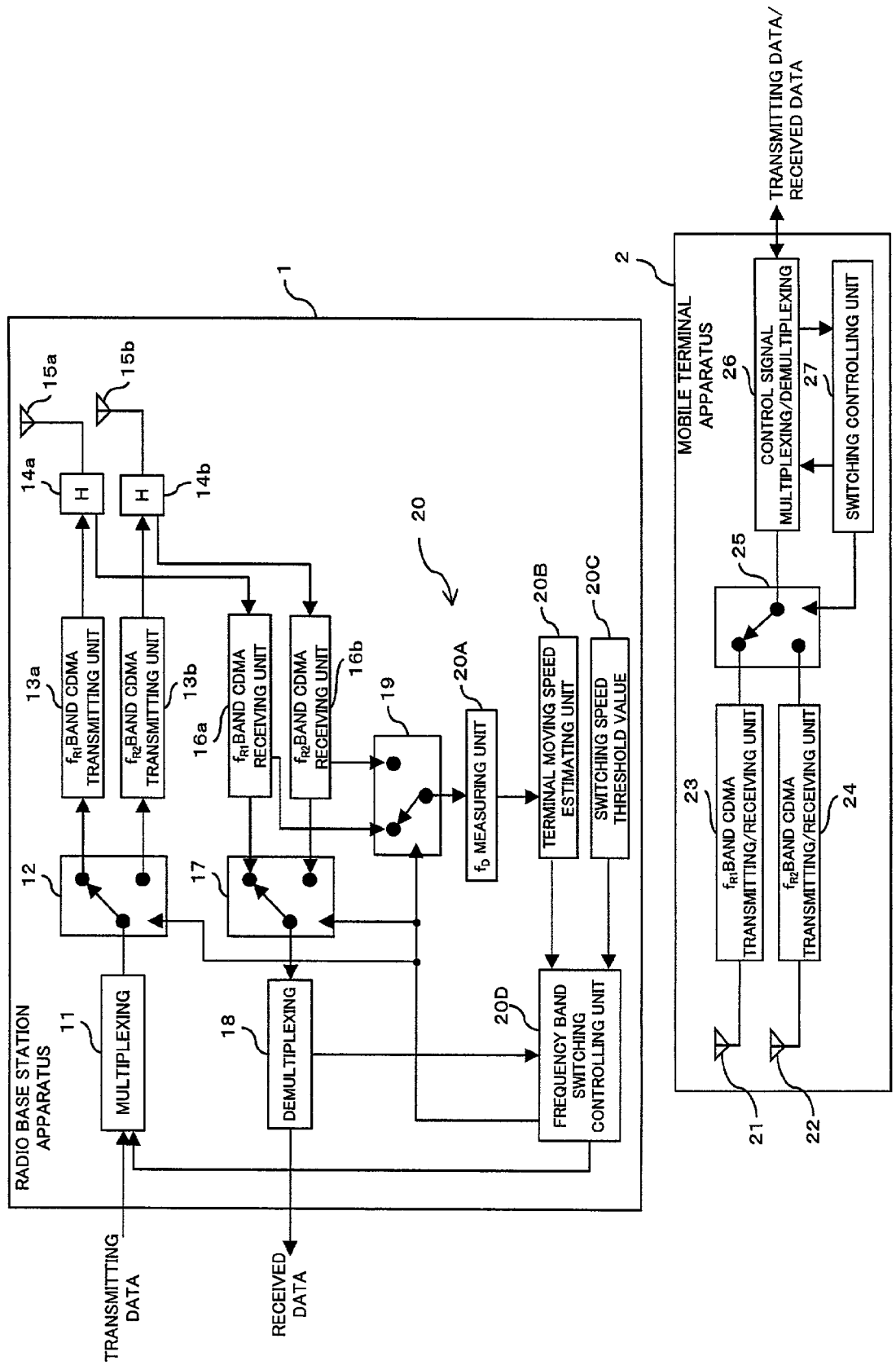
FIG. 1 is a block diagram showing a structure of a CDMA communication system (mobile communication system) according to an embodiment of this invention.

FIG. 1 is a block diagram showing a structure of a CDMA communication system (mobile communication system) according to an embodiment of this invention. The CDMA communication system shown in FIG. 1 comprises at least one radio base station apparatus (radio apparatus; hereinafter referred simply as a base station) 1, and at least one mobile terminal apparatus (hereinafter referred simply as a terminal) 2. The base station 1 can make a two-way radio communication in CDMA system with a terminal (in-zone terminal) present in its own communicable area (cell).

(A1) Base Station Structure

In concrete, the base station 1 according to this embodiment comprises, when attention is paid to its essential parts, a multiplexing unit 11, a change-over switch 12, a CDMA transmitting unit 13a for fR1 band (first frequency band) and a CDMA transmitting unit 13b for fR2 band (second frequency band) as a transmitting system, a CDMA receiving unit 16a for fR1 band, a CDMA receiving unit 16b for fR2 band, a change-over switch 17 and a demultiplexing unit 18 as a receiving system, as shown in, for example, FIG. 1. The base station 1 further comprises a change-over switch 19, a Doppler frequency (fD) measuring unit 20A, a terminal moving speed estimating unit 20B, a switching speed threshold value holding unit 20C and a frequency band switching controlling unit 20D as a control system 20.

Although not shown in FIG. 1, the base station 1 has a TPC function for performing TPC (transmitting power control) on the forward link (radio signals for forward communication) on the basis of a received signal from the terminal 2. In FIG. 1, reference characters 14a and 14b denote hybrids (H), 15a and 15b denote transmitting/receiving antennae for fR1 and fR2 band, respectively, which are shared by the above transmitting system and the receiving system.

Namely, a transmitting signal from the CDMA transmitting unit for fR1 band (fR2 band) 13a (13b) is transmitted toward the terminal 2 from the transmitting/receiving antenna 15a (15b) through the hybrid 14a (14b). On the other hand, a radio signal in the fR1 band (the fR2 band) from the terminal 2 is received by the transmitting/receiving antenna 15a (15b), and outputted to the CDMA receiving unit for fR1 band (fR2 band) 16a (16b) by the hybrid 14a (14b).

Namely, the CDMA transmitting units 13a and 13b, the hybrids 14a and 14b, the CDMA receiving units 16a and 16b, and the transmitting/receiving antennae 15a and 15b function as a radio communicating unit, which can communicate with the terminal 2 using either one of M=2 types of radio frequency bands (the fR1 band, the fR2 band).

(A1.1) Transmitting System Structure

In the above transmitting system, the multiplexing unit (control signal adding unit) 11 multiplexes (adds) transmitting data to the terminal 2 and a control signal (a selected frequency notification signal, a switching timing instruction signal or the like) from the frequency band switching controlling unit 20D. The change-over switch 12 switches its output according to a switching controlling signal from the frequency band switching controlling unit 20D to supply the output (a transmitting signal) from the multiplexing unit 11 to either the CDMA transmitting unit for fR1 band 13a or the CDMA transmitting unit for fR2 band 13b.

The CDMA transmitting unit 13a for fR1 band outputs the transmitting signal from the change-over switch 12 as a signal in a specific frequency band (the fR1 band). The CDMA transmitting unit 13b for fR2 band outputs the transmitting signal from the change-over switch 12 as a signal in another frequency band (the fR2 band) differing from the above fR1 band. Incidentally, a relationship in height between fR1 (the first frequency band) and fR2 (the second frequency band) is fR2>fR1 in this embodiment; the fR1 band=850-MHz band, and the fR2 band=2-GHz band, for example.

CDMA Transmitting Unit Structure

Each of the above CDMA transmitting units 13a and 13b has a common structure in view of hardware, comprising traffic channel transmission processing units 131 equal in number to traffic channels, a multiplexing unit (MUX) 132, a scrambler (multiplier) 133, a digital filter 134, a DA converter (DAC: Digital-to-Analog Converter) 135, an orthogonal modulator 136, an RF (Radio Frequency) oscillator for forward link (base station 1 to terminal 2) 137, a filter 138, a high-power amplifier (HPA) 139 and the like. An oscillated frequency of the above RF oscillator 137 is changed by each of the CDMA transmitting units 13a and 13b, whereby the CDMA transmitting unit 13a can generate a transmitting signal in the fR1 band, while the CDMA transmitting unit 13b can generate a transmitting signal in the fR2 band.

In concrete, a transmitting signal [(transmitting data)+(control signal)] is undergone necessary FEC (error correction) coding and interleaving process in an FEC encoder 131a and an interleaver 131b, multiplied by a channelisation code such as a Walsh code or the like in a multiplier 131c to be a channelisation signal, and multiplexed on a pilot channel signal and a control channel signal in the multiplexing unit 132.

The multiplexed signal obtained as above is scrambled (spectrum-spread-modulated) with a scrambling code that is a PN (pseudo noise) code (chip rate=1.2288 Mcps) in the scrambler 133, filtered (removed unnecessary signal components thereof) in the digital filter 134, DA-converted in the DA converter 135, undergone orthogonal-modulation such as QPSK or the like with an RF signal from the RF oscillator 137 in the orthogonal modulator 136, finally outputted to the hybrid 14a or 14b shown in FIG. 1 through the filter 138 and the HPA 139 to be transmitted toward the terminal 2 from the transmitting/receiving antenna 15a or 15b.

Figure 2:
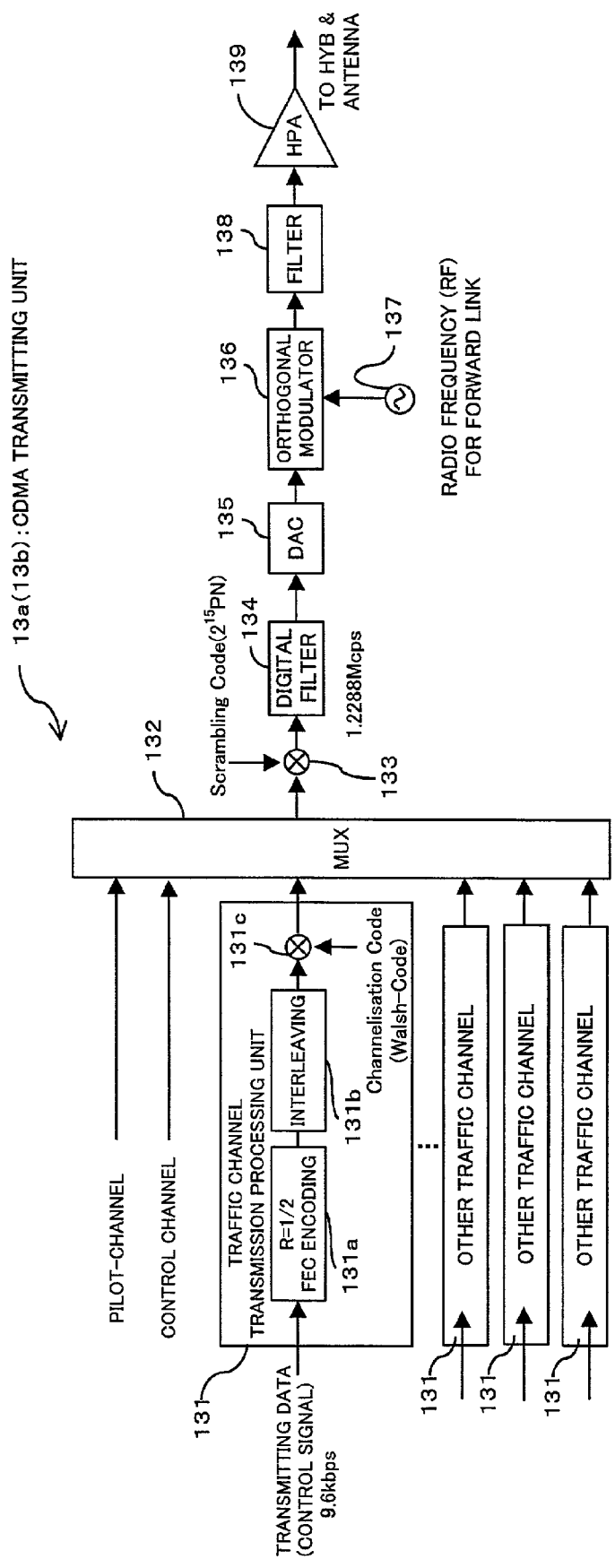
FIG. 2 is a block diagram showing in detail structures of essential parts of a CDMA transmitting unit in a radio base station apparatus shown in FIG. 1.

In the structure shown in FIG. 2, the transmitting signal is modulated in the RF band. However, various manners are possible. For example, the transmitting signal may be modulated in the intermediate frequency (IF) band, then frequency-converted to the RF band (up-converted).

(A1.2) Receiving System Structure

In FIG. 1, the CDMA receiving unit for fR1 band 16a performs a necessary demodulating process on a received signal in the fR1 band from the terminal 2 inputted through the hybrid 14a. The CDMA receiving unit for fR2 band 16b performs a necessary demodulating process on a received signal in the fR2 band from the terminal 2 inputted through the hybrid 14b.

CDMA Receiving Unit Structure

Figure 3:
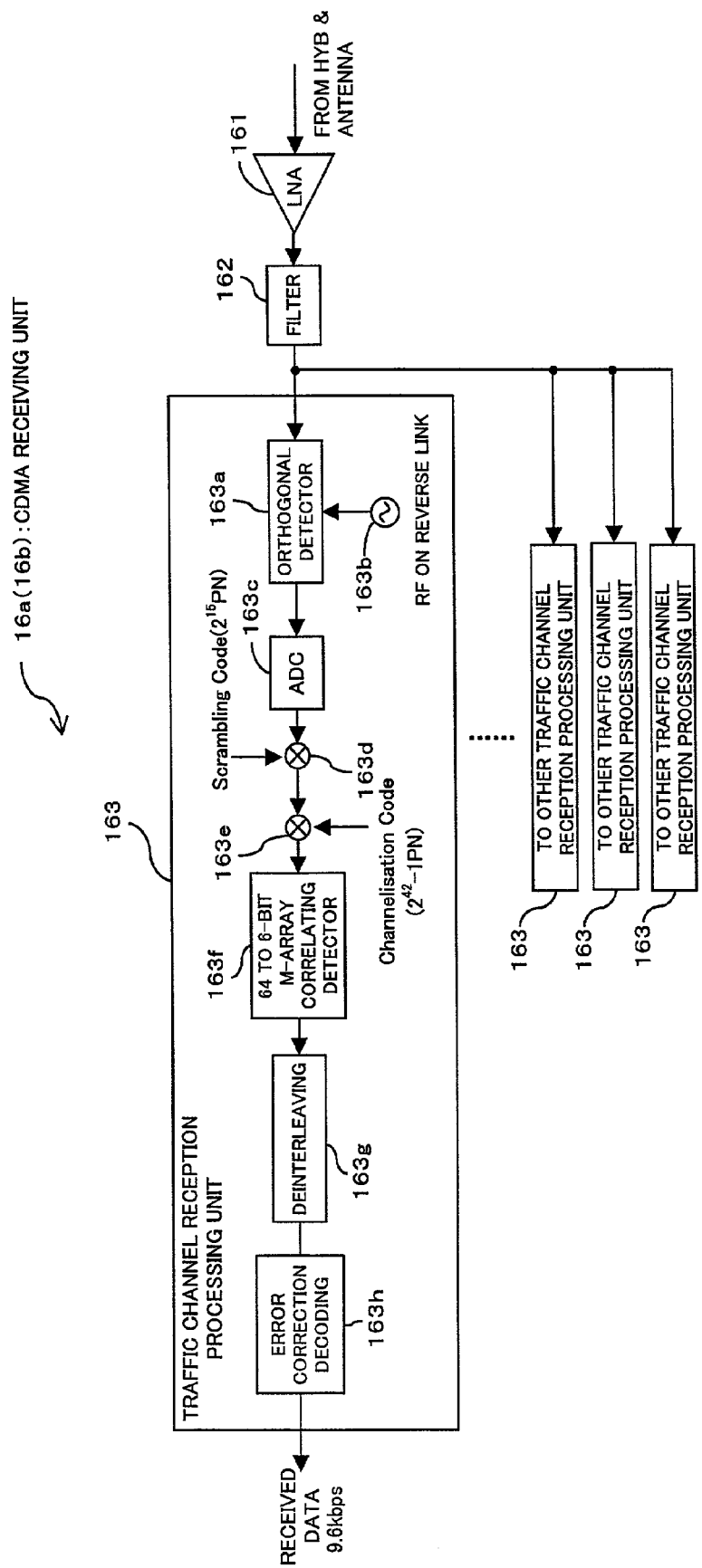
FIG. 3 is a block diagram showing in detail structures of essential parts of a CDMA receiving unit in the radio base station apparatus shown in FIG. 1.

Each of the CDMA receiving units 16a and 16b according to this embodiment comprises a low noise amplifier (LNA) 161, a filter 162, traffic channel reception processing units 163 equal in number to the traffic channels, and the like, as shown in, for example, FIG. 3. Each of the traffic channel receiving units 163 comprises an orthogonal detector 163a, an RF oscillator for reverse link (terminal 2 to base station 1) 163b, an AD converter (ADC: Analog-to-Digital Converter) 163c, a descrambler (multiplier) 163d, a multiplier 163e, an M-Array correlating detector 163f, a deinterleaver 163g, an error correction decoder 163h, and the like. Like a relationship between the CDMA transmitting units 13a and 13b, an oscillated frequency of the above RF oscillator 163b is changed by each of the CDMA receiving units 16a and 16b, whereby the CDMA receiving unit 16a can process a received signal in the fR1 band, while the CDMA receiving unit 16b can process a received signal in the fR2 band.

In concrete, the received signal from the terminal 2 is amplified and filtered in the LNA 161 and the filter 162, then inputted to each of the traffic channel reception processing units 163.

In each of the traffic channel reception processing units 163, the inputted signal (received signal) is orthogonal-detected with the RF signal from the RF oscillator 163b in the orthogonal detector 163a, AD-converted in the AD converter 163c, and undergone a descrambling (despreading) process with a PN code and a channel demodulating process with a channelisation code in the descrambler 163d and the multiplier 163e.

Thereafter, the received signal is undergone an M-Array correlating detecting process in the M-Array correlating detector 163f, undergone a deinterleaving process and an error correction decoding process in the deinterleaver 163g and the error correction decoder 163h, and outputted to the demultiplexing unit 18 through the above change-over switch 17.

M-Array Correlating Detection

Here, description will be made of the above M-Array correlating detecting process.

In a land mobile communication system such as a cellular system, the amplitude or phase of a transmitting signal rapidly fluctuates due to an effect of fading, so that it is impossible to perform coherent detection to regenerate a reference phase from the received signal and demodulate it. For this reason, a CDMA communication system in conformity with IS-95 transmits a pilot channel on the forward link, the receiving side (terminal 2) performs coherent detection with the pilot channel as the reference phase, while adopting the M-Array correlating detection system on the reverse link.

Incidentally, although the IS-95 system uses the M-Array correlating detecting system with Walsh codes having a length of 64 bits, here is described a case in which Walsh codes having a length of 16 bits (16 to 4-bit M-Array) are used as shown in the following table 1 will be here described, for the sake of simplicity.

TABLE 1

TABLE OF 16-BIT WALSH CODES

| CODE NUMBER (BINARY NUMERAL) | | WALSH CODE |
|---|---|---|
| W0 | (0000) | 0000 0000 0000 0000 |
| W1 | (0001) | 0101 0101 0101 0101 |
| W2 | (0010) | 0011 0011 0011 0011 |
| W3 | (0011) | 0110 0110 0110 0110 |
| W4 | (0100) | 0000 1111 0000 1111 |
| W5 | (0101) | 0101 1010 0101 1010 |
| W6 | (0110) | 0011 1100 0011 1100 |
| W7 | (0111) | 0110 1001 0110 1001 |
| W8 | (1000) | 0000 0000 1111 1111 |
| W9 | (1001) | 0101 0101 1010 1010 |
| W10 | (1010) | 0011 0011 1100 1100 |
| W11 | (1011) | 0110 0110 1001 1001 |
| W12 | (1100) | 0000 1111 1111 0000 |
| W13 | (1101) | 0101 1010 1010 0101 |
| W14 | (1110) | 0011 1100 1100 0011 |
| W15 | (1111) | 0110 1001 1001 0110 |

It is clearly seen from Table 1 that eight bits in each code differ from the others in other code (code distance=8). The transmitting side (terminal 2) collects four bits of data to be transmitted (interleaved output), and selects a Walsh code corresponding to the binary digit value. For instance, when the interleaved output is "1011", a code number =W11 (0110 0110 1001 1001) is selected (16 to 4-bit M-Array encoding), and transmitted.

On the other hand, the receiving side (base station 1) collects every 16 bits of received data, and compares them with each of all the Walsh codes (W0–w15) to determine whether they coincide with each other. The receiving side determines that a Walsh code having the largest number of coinciding bits is a code actually transmitted, and outputs its number (binary number four bits) as a result of correlation detection. For instance, assuming that an error of three bits occurs while a Walsh code (0110 0110 1001 1001) transmitted from the terminal 2, and the base station 1 receives a code (0100 0111 1001 1000).

When this code is compared with each of the code numbers W0–w15, the results are as shown in the following table 2.

TABLE 2

RESULTS OF COMPARISON

| CODE NUMBER (BINARY NUMERAL) | | WALSH CODE | THE NUMBER OF COINCIDING BITS |
|---|---|---|---|
| W0 | (0000) | 0000 0000 0000 0000 | 9 |
| W1 | (0001) | 0101 0101 0101 0101 | 9 |
| W2 | (0010) | 0011 0011 0011 0011 | 7 |
| W3 | (0011) | 0110 0110 0110 0110 | 7 |
| W4 | (0100) | 0000 1111 0000 1111 | 9 |
| W5 | (0101) | 0101 1010 0101 1010 | 9 |
| W6 | (0110) | 0011 1100 0011 1100 | 7 |
| W7 | (0111) | 0110 1001 0110 1001 | 7 |
| W8 | (1000) | 0000 0000 1111 1111 | 7 |
| W9 | (1001) | 0101 0101 1010 1010 | 11 |
| W10 | (1010) | 0011 0011 1100 1100 | 9 |
| W11 | (1011) | 0110 0110 1001 1001 | 13 |
| W12 | (1100) | 0000 1111 1111 0000 | 11 |
| W13 | (1101) | 0101 1010 1010 0101 | 7 |
| W14 | (1110) | 0011 1100 1100 0011 | 5 |
| W15 | (1111) | 0110 1001 1001 0110 | 9 |

As seen from Table 2, the code number W11 has the largest number (13) of coinciding bits, so that a code number W11 is selected, and "1011" is outputted as a result of the correlation detection. In this case, since a code distance of the Walsh codes is eight, it is possible to accurately detect even if an error of up to three bits occurs in 16 bits.

The actual IS-95 system uses Walsh codes having a length of 64 bits, thus an input of the correlating detector 163$f$ is 64 bits, while an output of the same is six bits (26=64) (namely, 64 to 6-bit M-Array), as shown in FIG. 3. In this case, since the code distance of a 64-bit Walsh code is 32, it is possible to decode even if an error of up to 15 bits occurs in 64 bits.

In the practical system, a process for extracting soft decision information for error correction decoding is often added. In CDMA 2000 or the like, coherent detection using a pilot channel is performed even on the reverse link.

In the change-over switch 17 in FIG. 1, an input thereof is switched according to a switching controlling signal from the frequency band switching controlling unit 20D, whereby the change-over switch 17 outputs either one of outputs from the above CDMA receiving units 16$a$ and 16$b$ (outputs from the error correction decoders 163$h$) to the demultiplexing unit 18. The demultiplexing unit (confirmation signal extracting unit) 18 demultiplexes the output (received signal) from the change-over switch 17 into received data and a control signal (reception confirmation signal in response to a selected frequency notification signal, a confirmation signal in response to a switching timing instruction signal, or the like to be described later) from the terminal 2. Incidentally, the control signal from the terminal 2 is supplied to the frequency band switching controlling unit 20D (switching timing instruction signal generating unit to be described later).

(A1.3) Control System Structure

In the change-over switch 19, an input thereof is switched according to a switching control signal from the frequency band switching controlling unit 20D, whereby the change-over switch 19 supplies either one of outputs of information useful to measure (detect) the Doppler frequency fD obtained in the CDMA receiving units 16$a$ or 16$b$ to the Doppler frequency measuring unit 20A. The Doppler frequency measuring unit (speed information detecting unit; detecting unit) 20A measures (detects) the Doppler frequency fD (information on a moving speed of the terminal 2) of a received signal from the received signal inputted from the change-over switch 19.

The terminal moving speed estimating unit 20B estimates a moving speed of the terminal 2 that has transmitted the received signal on the basis of the Doppler frequency fD obtained by the above Doppler frequency measuring unit 20A. The Doppler frequency measuring unit 20A and the terminal moving speed estimating unit 20B can be configured, by applying a technique described in, for example, Japanese Patent Laid-Open Publication No. 6-242225 or the like.

In this case, an output of the AD converter 163$c$ (an output of the orthogonal detector 163$a$) may be used as useful information to measure (detect) the above Doppler frequency fD. Alternatively, when AGC (Automatic Gain Control) is performed in the CDMA receiving units 16$a$ and 16$b$, gain information thereof may be used, or an output of the M-Array correlating detector 163$f$ (a result of correlating detection) may be used, or the both may be used for improvement of accuracy of measurement of the Doppler frequency fD.

The switching speed threshold value holding unit 20C holds a threshold value (hereinafter referred as a switching speed threshold value) for a terminal moving speed that becomes a reference when the change-over switches 12, 17 and 19 are switched. The switching speed threshold value holding unit 20C is configured with a RAM or the like, for example. The switching speed threshold value may be suitably set by a host system managing operation of the entire base station 1.

The frequency band switching controlling unit (use frequency selection controlling unit; selection controlling unit) 20D compares the terminal moving speed obtained by the terminal moving speed estimating unit 20B with the above switching speed threshold value, controls the change-over switches 12, 17 and 19 according to a result of the comparison, and selects (switches) a radio frequency band (the fR1 band or the fR2 band) to be used in the communication with the terminal 2.

Figure 5:
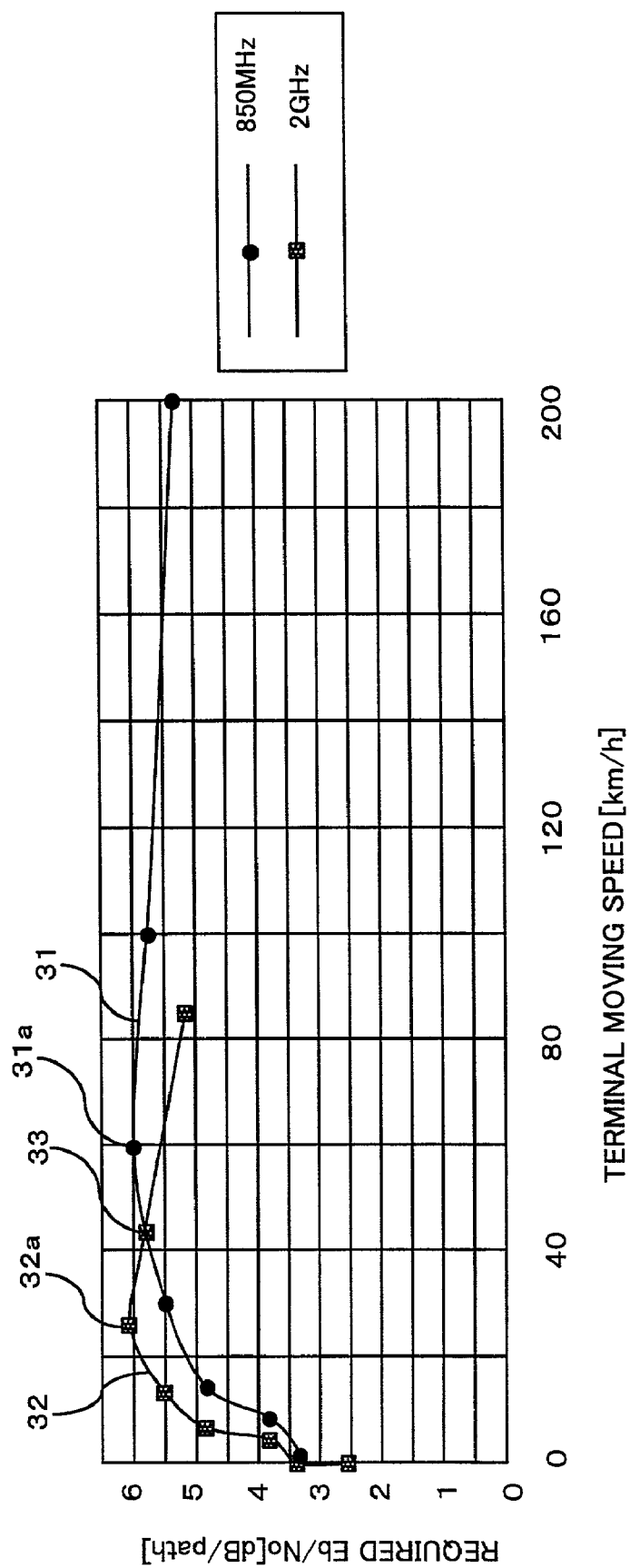
FIG. 5 is a graph showing an example of required Eb/No characteristics to a mobile terminal moving speed according to this embodiment.
Figure 13:
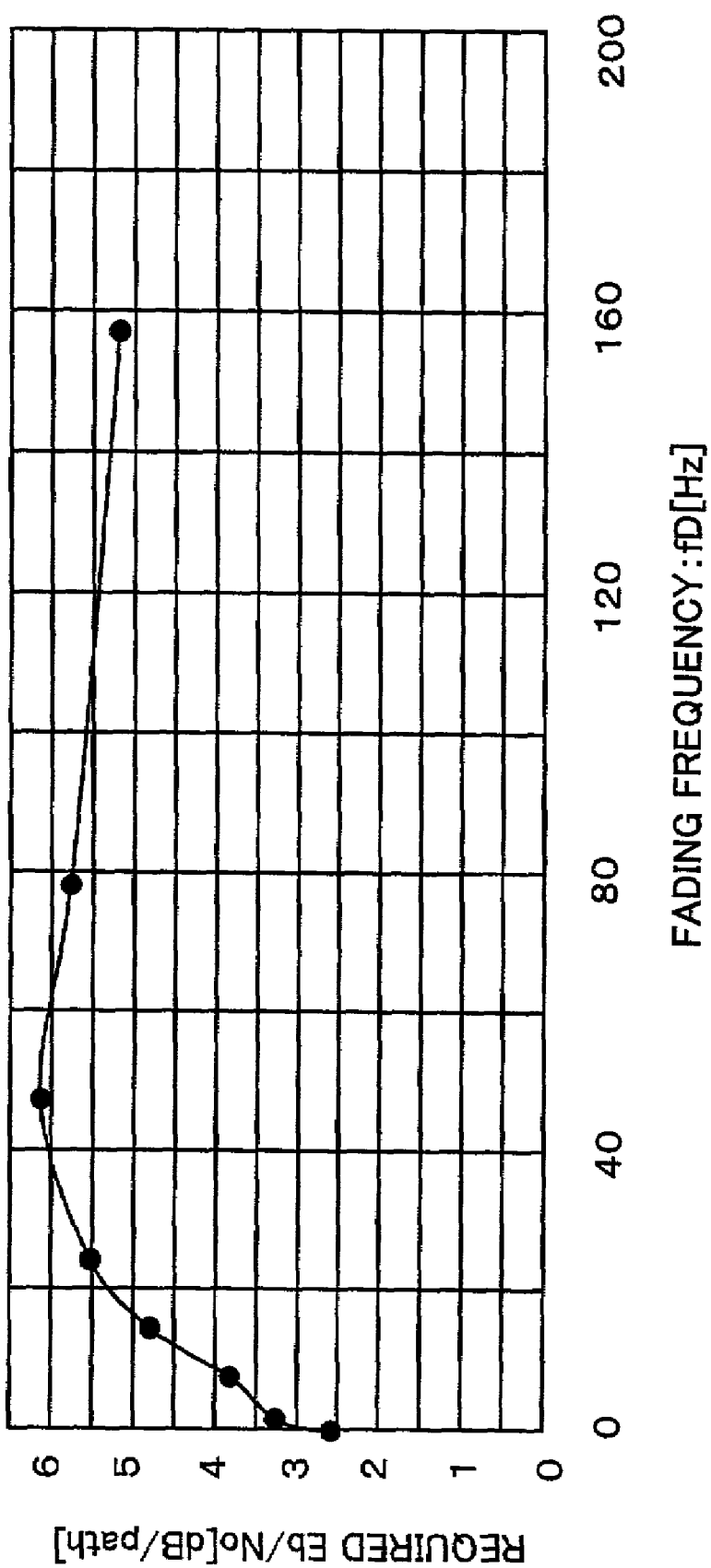
FIG. 13 is a graph showing an example of a required Eb/No characteristic to a fading frequency in a CDMA communication system.

Here is described a manner of determining the above switching speed threshold value. FIG. 5 is a graph showing an example of required Eb/No (signal-to-(interference+noise)power ratios required to satisfy desired communication quality) to the terminal moving speed when two kinds of radio frequency bands (the fR1 band and the fR2 band) are 850-MHz band and 2-GHz band, respectively. The graph is obtained by calculating the Doppler frequency fD to the terminal moving speed using the above equation (3) for each of the radio frequency bands, applying a result of the calculation to FIG. 13, and determining a required Eb/No. In FIG. 5, a characteristic 31 represents a required Eb/No characteristic at a radio frequency in the 850-MHz band, while a characteristic 32 represents a required Eb/No characteristic at a radio frequency in the 2-GHz band.

As seen from FIG. 5, when a radio frequency in the 850-MHz band is used, the required Eb/No is maximum (the worst value) (the required Eb/No changing from a tendency to increase to a tendency to decrease) at a point (at the terminal moving speed of about 60 km/h) denoted by a reference numeral 31a. When a radio frequency in the 2-GHz band is used, the required Eb/No is of the worst value at a point (at the terminal moving speed of about 25 km/h) denoted by a reference numeral 32a. Incidentally, a non-monotonous characteristic as this is peculiar when a CDMA system using both TPC and FEC is employed, as described above.

Accordingly, if the use radio frequency band is switched at a point corresponding to the maximum value (about 5.8 dB) of the required Eb/No that the above both characteristics 31 and 32 (that is, an intersection of the characteristics 31 and 32) are satisfied as a boundary (namely, a switching speed threshold value), it is possible to improve the worst value of the required Eb/No.

Namely, when the terminal moving speed is below 42.5 km/h, a radio frequency belonging to the 850-MHz band is selected as a radio frequency to be used to communicate with the base station 1. When the terminal moving speed exceeds it, a radio frequency belonging to the 2 GHz-band is selected. In other words, the higher the terminal moving speed, the use frequency is selected from a higher frequency band (2-GHz), and assigned for the communication with the terminal 2. Conversely, the lower the terminal moving speed, the use frequency is selected from a lower frequency band (850-MHz).

As this, the switching speed threshold value is determined on the basis of the required Eb/No characteristics 31 and 32 relating to the radio frequency band and the terminal moving speed, the use radio frequency band is switched according to a result of comparison between the switching speed threshold value and the terminal moving speed. Whereby, the worst value of the required Eb/No can be improved to about 5.8 dB in this embodiment.

Assuming that the worst values of the required Eb/Nos in the 850-MHz band and 2-GHz band are about 6.1 dB, a quantity of the improvement becomes about 6.1−5.8=0.3 dB (7.2% when it is converted into a quantity of improvement of the channel capacity). Meanwhile, since there is a possibility to obtain a larger effect of the improvement depending on the terminal moving speed, it is expected that an actual quantity of improvement of the channel capacity is becomes larger. A practical switching speed threshold value or an effect of the improvement changes according to a used radio frequency, TPC system or FEC system. It is thus possible to readily determine them by making a graph corresponding to FIG. 5 in simulation or the like when the characteristics are determined.

In this case, the frequency band switching controlling unit 20D such controls the change-over switches 12, 17 and 19 that the use radio frequency band is the 850-MHz band when the terminal moving speed is not higher than 42.5 km/h, or the 2-GHz band when the terminal moving speed exceeds it. When the base station 1 switches the use radio frequency band, the communication cannot be continued if the terminal 2 does not switch the use radio frequency band to the same radio frequency band as the base station 1.

Therefore, it is necessary to synchronize the use radio frequency between the base station 1 and the terminal 2.

According to this embodiment, a radio frequency band (to be switched to) and a switching timing selected on the side of the base station 1 is notified to the terminal 2 with a control signal (selected frequency notification signal, switching timing instruction signal), whereby synchronization is established.

For this purpose, the frequency band switching controlling unit 20D according to this embodiment also has a function as a notification signal generating unit for generating the above selected frequency notification signal, and a switching timing instruction signal generating unit for generating a switching timing instruction signal. The latter switching timing instruction signal is generated when a reception confirmation signal in response to the former selected frequency notification signal is received from the terminal 2 (when the reception confirmation signal is demultiplexed from the received signal in the demultiplexing unit 18) as an opportunity, and multiplexed on transmitting data in the multiplexing unit 11 as well as the former selected frequency notification signal.

(A2) Moving Terminal Structure

Next description will be made of a structure of the terminal 2 according to this embodiment. The terminal 2 according to this embodiment comprises, when attention is paid to essential parts thereof, a CDMA transmitting/receiving unit 23 for fR1 band, a CDMA transmitting/receiving unit 24 for fR2 band, a change-over switch 25, a control signal multiplexing/demultiplexing unit 26 and a switching controlling unit 27, as shown in FIG. 1.

The CDMA transmitting/receiving unit 23 for fR1 band makes a radio communication with the base station 1 in CDMA system using a radio signal in a radio frequency band in the fR1 band (for example, 850-MHz or the like), whereas the CDMA transmitting/receiving unit 24 for fR2 band makes a radio communication with the base station 1 in CDMA system using a radio signal in a radio frequency band in the fR2 band (for example, the 2-GHz band). Namely, these CDMA transmitting/receiving units 23 and 24 function as a radio communicating unit which can communicate with the base station 1 using either one of two kinds (M=2) of radio frequency bands (the fR1 band and the fR2 band) correspondingly to a kind of the radio frequency band used by the base station 1.

Figure 4:
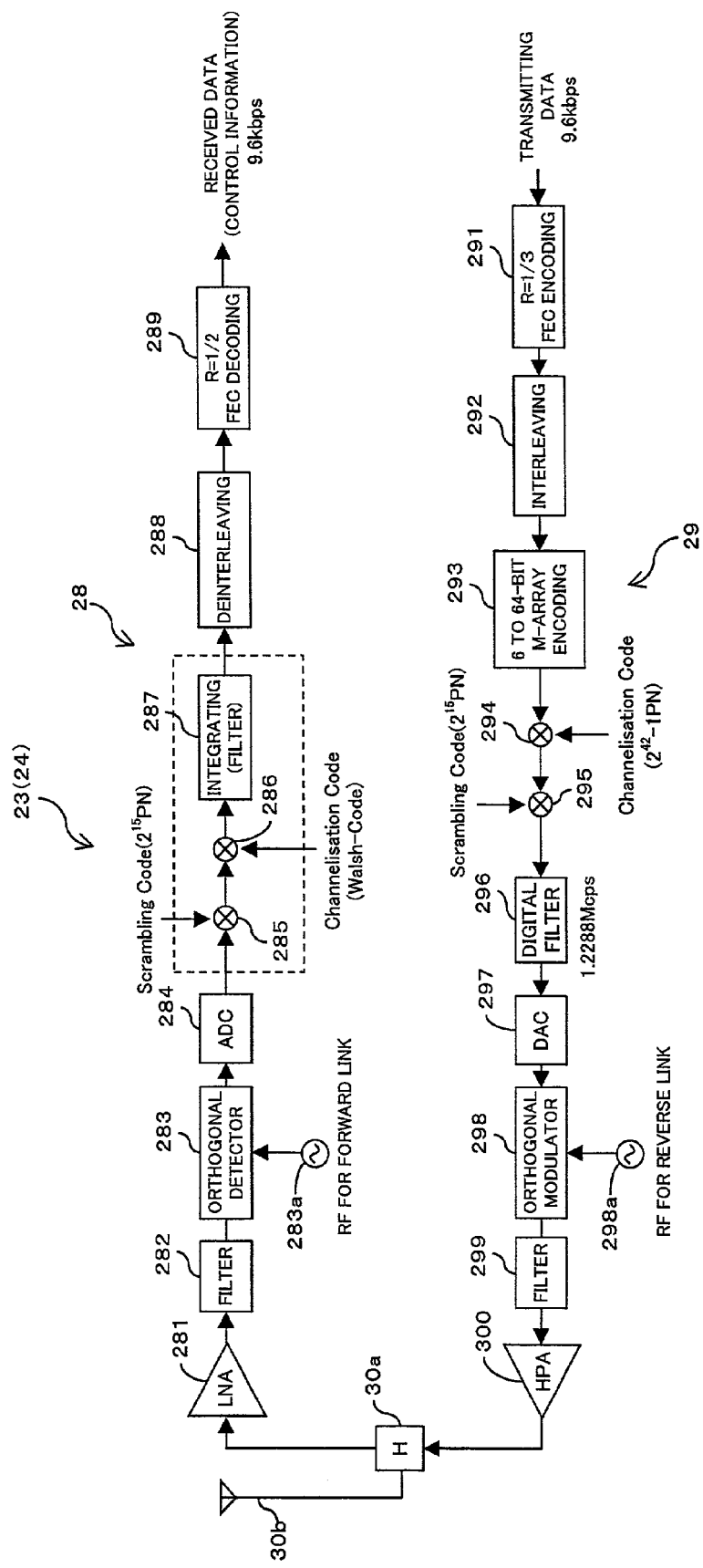
FIG. 4 is a block diagram showing in detail structures of essential parts of a CDMA transmitting/receiving unit in a mobile terminal apparatus shown in FIG. 1.

In concrete, the CDMA transmitting/receiving units 23 and 24 according to this embodiment have a common hardware structure, as shown in, for example, FIG. 4. Each of the CDMA transmitting/receiving units 23 and 24 comprises a low noise amplifier (LNA) 281, a filter 282, an orthogonal detector 283, an RF oscillator for forward link 283a, an AD converter (ADC) 284, a descrambler (multiplier) 285, a multiplier 286, an integrator (filter) 287, a deinterleaver 288, an FEC decoder 289 and the like as a receiving system 28, and an FEC encoder 291, an interleaver 292, an M-Array correlating encoder 293, a multiplier 294, a scrambler (multiplier) 295, a digital filter 296, a DA converter (DAC) 297, an orthogonal modulator 298, an RF oscillator for reverse link 298a, a filter 299, a high-power amplifier (HPA) 300 and the like as a transmitting system 29, along with a hybrid (H) 30a and a transmitting/receiving antenna 30b shared by the transmitting system 28 and the receiving system 29.

Oscillated frequencies of the RF oscillators 283a and 298a in the above receiving system 28 and transmitting system 29 are made different from each other between the CDMA transmitting/receiving unit 23 and the CDMA transmitting/receiving unit 24, whereby the CDMA transmitting unit 23 can make a two-way radio communication with the base station 1 using a radio signal in the fR1 band, whereas the CDMA transmitting/receiving unit 24 can make a two-way radio communication with the base station 1 using a radio signal in the fR2 band.

In concrete, a received signal from the base station 1 is inputted to the receiving system 28 through the transmitting/receiving antenna 30b and the hybrid 30a, amplified and filtered by the LNA 281 and the filter 282, and undergone orthogonal detection with an RF signal (an RF signal in the fR1 band in the case of the CMDA transmitting/receiving unit 23, or an RF signal in the fR2 band in the case of the transmitting/receiving unit 24) from the RF oscillator 283a in the orthogonal detector 283. The received signal undergone the quadrature detection is converted into a digital signal in the AD converter 284, then despread and channel-decoded.

Namely, an output of the AD converter 284 is multiplied by a scrambling code (PN code) to be descrambled (despread) in the descrambler 285, multiplied by a channelisation code to be undergone the channel decoding process in the multiplier 286, and integrated in the integrator 287. The integrated received signal is deinterleaved in the deinterleaver 288, decoded in the FEC decoder 289, and outputted to the change-over switch 25.

On the other hand, a transmitting signal to the base station 1 is FEC-encoded in the FEC encoder 291 in the transmitting system 29, interleaved in the interleaver 292, and M-Array encoded in the M-Array encoder 293, as described above. The M-Array-encoded transmitting signal is multiplied by a channelisation code in the multiplier 294 to be a channel signal, scrambled (spread) by a PN code in the scrambler 297, filtered in the digital filter 296, and converted into an analog signal in the DA converter 297.

This analog signal is orthogonal-modulated in OQPSK (Offset QPSK) or the like with an RF signal from the FR oscillator 298a in the quadrature modulator 298, filtered in the filter 299, amplified to a necessary transmitting power in the high-power amplifier 300, and transmitted toward the base station 1 through the hybrid 30a and the transmitting/receiving antenna 30b.

In the terminal structure shown in FIG. 1, the change-over switch 25 switches to (selects) the CDMA transmitting/receiving unit 23 or 24 to be used (namely, a use radio frequency band) under control of the switching controlling unit 27. The control signal multiplexing/demultiplexing unit 26 has a function of demultiplexing a control signal (selected frequency notification signal, switching timing instruction signal or the like) contained (multiplexed) in a received signal from the base station 1, and outputting it to the switching controlling unit 27, on the other hand, multiplexing a control signal (reception confirmation signal in response to the selected frequency notification signal, confirmation signal in response to the switching timing instruction signal or the like) to the base station 1 on a transmitting signal to the base station 1.

Namely, the control signal multiplexing/demultiplexing unit 26 fulfills functions (1) to (3) shown below:

1) function as a selected frequency notification signal receiving unit which receives a selected frequency notification signal for notifying of a radio frequency band selected according to a result of comparison between an own terminal moving speed and the above switching speed threshold value in the base station 1 from the CDMA transmitting/receiving unit 23 or 24 configuring the radio communicating unit;

2) function as a confirmation signal transmitting unit which transmits a confirmation signal in response to the above selected frequency notification signal to the base station 1; and 3) function as a switching timing instruction signal receiving unit which receives a switching timing instruction signal in response to the above confirmation signal from the base station 1.

The switching controlling unit (use frequency selection controlling unit; selection controlling unit) 27 controls the change-over switch 25 according to a control signal (selected frequency notification signal, switching timing instruction signal) from the base station 1 demultiplexed from a received signal by the above control signal multiplexing/demultiplexing unit 26 to switch a radio frequency band to be used in the communication with the base station 1.

In FIG. 1, the CDMA transmitting units 16a and 16b, the CDMA receiving unit 16a and 16b, and the CDMA transmitting/receiving units 23 and 24 are provided exclusively for the respective two frequency bands fR1 and fR2. However, it is alternatively possible to provide only parts or circuits (for example, oscillator, synthesizer, filter and the like) required for each of the frequency bands fR1 and fR2, and share parts or circuits other than these, thereby reducing the size of the apparatus.

(A3) Description of Operation

Now, description will be made of an operation of the CDMA communication system in the above structure according to this embodiment with reference to FIG. 6.

Figure 6:
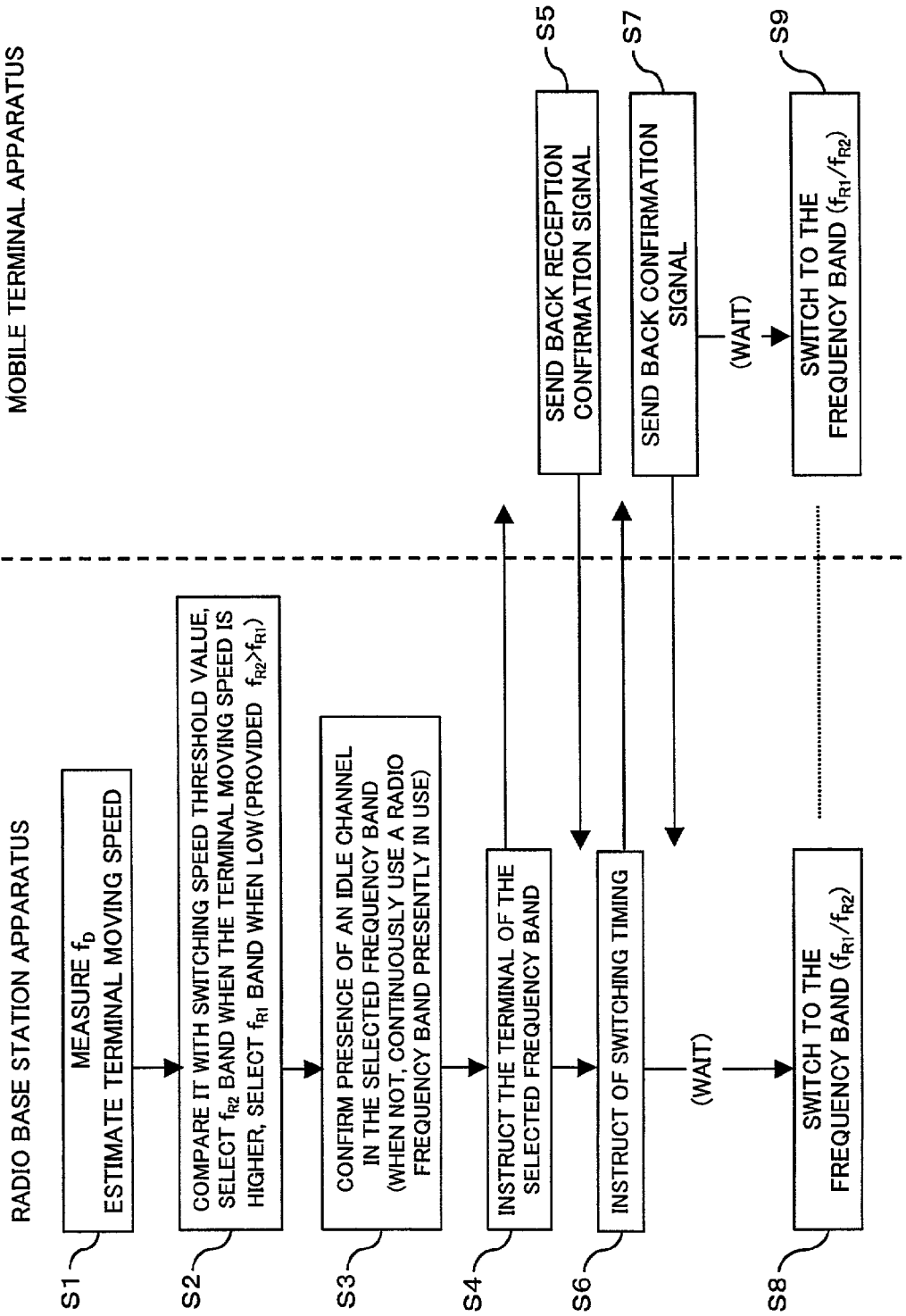
FIG. 6 is a sequence diagram for illustrating an operation of the CDMA communication system shown in FIG. 1.

As shown in FIG. 6, the base station 1 measures the Doppler frequency fD on the basis of a received signal by the Doppler frequency measuring unit 20A, and determines a moving speed of the terminal 2 on the basis of the Doppler frequency fD by the terminal moving speed estimating unit 20B (step S1). At this time, either the fR1 band or the fR2 band may be used for the communication between the base station 1 and the terminal 2. However, in the initial state, it is desirable to use a lower frequency band (the fR1 band in this embodiment).

In the base station 1, the frequency band switching controlling unit 20D compares the terminal moving speed determined by the terminal moving speed estimating unit 20B with the switching speed threshold value (42.5 km/h in the above case) at predetermined cycles. When the terminal moving speed is not less than the switching speed threshold value, the base station 1 selects the fR2 band (the 2-GHz band, for example) as the use radio frequency band. When the terminal moving speed is less than the switching speed threshold value, the base station 1 selects the fR1 band (the 850-MHz band) as the use radio frequency band (step S2). When the radio frequency bands before and after the selection are the same, selection of the radio frequency band used up to that time is kept.

The frequency band switching controlling unit 20D confirms whether there is an idle channel in the selected frequency band fR1 or fR2. When there is an idle channel, the frequency band switching controlling unit 20D notifies the terminal 2 of the selected frequency band fR1 or fR2 with a control signal (selected frequency notification signal). When there is no idle channel, a frequency band fR1 or fR2 presently in use is continuously used (steps S3 and S4). In this case, notification of the selected frequency with the selected frequency notification signal to the terminal 2 may be performed, or not.

When the terminal 2 receives the selected frequency notification signal from the base station 1, the switching controlling unit 27 generates a reception confirmation signal, and sends it back to the base station 1 (step S5). When receiving the reception confirmation signal, the base station 1 instructs a switching timing of the use radio frequency band to the terminal 2 with a switching timing instruction signal (step S6). When the terminal 2 receives the switching timing instruction signal, the switching controlling unit 27 generates a confirmation signal, and sends it back to the base station 1 (step S7).

After that, the base station 1 and the terminal 2 together wait for a timing defined by the above switching timing instruction signal, and simultaneously switch the use radio frequency band thereof to a selected radio frequency band (steps S8 and S9). When radio frequency bands before and after the switching are the same, a radio frequency band used up to that time is kept, as a result. Synchronization of the switching timing may be established in another manner.

The use radio frequency band to be used between the base station 1 and the terminal 2 is switched to an optimum frequency band according a terminal moving speed using a communication quality characteristic (frequency dependency) to the Doppler frequency fD in the CDMA communication system to improve the worst value of the required Eb/No in the CDMA communication system in which a relationship between the Doppler frequency fD and the transmission quality degradation is non-monotonous, as described above with reference to FIG. 5. This allows improvement of the communication quality and increases the channel capacity.

(B) First Modification

In a radio propagation environment of a mobile communication system such as a CDMA communication system, there generates fluctuation (local median value fluctuation) in radio wave propagation loss due to shadowing or the like caused by a building or the like (refer to, for example, the above reference 3). Since the local median value fluctuation is log-normal fluctuation, the larger the local median value fluctuation standard deviation (σ stm) of an interference wave from other cell, the more the other-cell interference ratio (fo) increases and the channel capacity decreases (for example, refer to references 4 and 5 below).

Reference 4: A. J. Viterbi and A. M. Viterbi, "Other-Cell Interference in Cellular Power-Controlled CDMA", IEEE Trans. On Commun., Vol. COM-42, No. 2/3/4, pp. 1501–1504,(1994).

Reference 5: A. J. Viterbi, et al., "Soft Handoff Extends CDMA Cell Coverage and Increases Reverse Link Capacity", IEEE J, Selected Areas in Commun., 12(8), pp. 1281–1288.

The higher the radio frequency, the larger the local median value fluctuation standard deviation (σ stm); the higher the radio frequency, the larger is the other-cell interference ratio fo. Since the channel capacity is inversely proportional to Eb/No_th×(fs+fo), as shown by the equation (2), it is possible to more increase the effect of the channel capacity improvement by considering a difference in the other-cell interference ratio fo between the radio frequency bands.

For instance, table 3 shows results of determination of the other-cell interference ratios on forward link in computer simulation where the local median value fluctuation standard deviations in the 850-MHz band and the 2-GHz band are 6 dB and 8 Db, respectively (refer to the above reference 3). Wherein, conditions of the computation are a distance attenuation parameter=3.5, shadowing correlation=0.5, a soft hand-off ratio=100% and a site ratio=90%. The self-cell interference ratio is 1 because of forward link.

"Distance attenuation parameter" is an index representing how much a power of the radio wave attenuates according to a propagation distance. "Distance attenuation parameter=3.5" means that a power of the radio wave attenuates of the order of the negative 3.5-th power. "Shadowing correlation" signifies correlation of interference due to shadowing of the radio wave. The larger the correlation value, the larger is an increase or decrease in power of the radio wave due to the interference of shadowing. The smaller this value, the smaller is a relationship between an increase or decrease in power of the radio wave and the interference of shadowing. "Soft handoff ratio" represents how many terminals 2 perform soft handoff. For example, when the number of the links (channels) used for soft handoff is two and one terminal 2 uses these channels, the soft handoff ratio is 100%. "Site ratio" represents a rate of a site in which the terminal 2 can actually communicate inside a cell.

TABLE 3

SIMULATION RESULTS OF f o to σ stm

| σ astm | f o |
|---|---|
| 6 d B | 0.88 |
| 8 d B | 1.26 |

Figure 7:
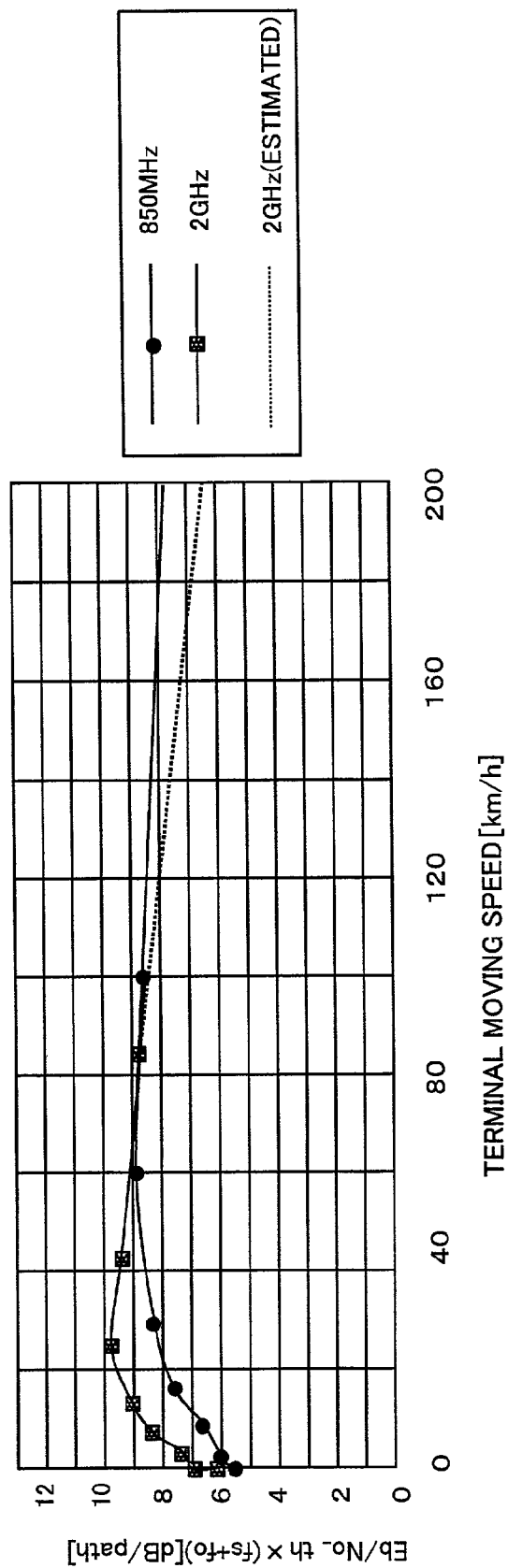
FIG. 7 is a graph showing an example of characteristics of "a product of Eb/No_th and interference power information (fs+fo)" to a mobile terminal moving speed according to a first modification of this embodiment.

FIG. 7 shows results of calculation of Eb/No_th×(fs+fo) to a terminal moving speed based on the above results. As shown in FIG. 7, when a change in the other-cell interference ratio fo is considered, improvement of about 0.7 dB to the worst value (approximately 17.5% when converted into the channel capacity) is expected by switching between the 850-MHz band (the fR1 band) and the 2-GHz band (the fR2 band) at a terminal moving speed 60–80 km/h as the switching speed threshold value, similarly to the above embodiment.

As above, the switching speed threshold value is determined on the basis of a characteristic of "a product of Eb/No_th and an interference power information (fs+fo)" to the radio frequency band and the terminal moving speed, so that a change in the other-cell interference ratio fo according to a radio frequency band is considered, which leads to an effect of further improvement of the communication quality and channel capacity.

Meanwhile, structures and operations of the base station 1 and the terminal 2 are similar to those of the above embodiment, excepting that the switching speed threshold value is determined on the basis of Eb/No_th×(fs+fo) to the terminal moving speed as shown in FIG. 7 as above, differently from the above embodiment.

In the above example, the interference power information (fs+fo) is calculated using a local median value fluctuation standard deviation to the radio frequency band. It is alternatively possible to calculate the interference power information (fs+fo) on each radio frequency band adding a change in other wave propagation parameters (for example, refer to the reference 3) such as a distance attenuation parameter to the radio frequency band and the like to increase the effect of the improvement.

(C) Second Modification

Local median value fluctuation standard deviation or multi-path interference changes according to operational environments of the system, installation conditions of the base station and the like. For this, values of the self(same)-cell interference ratio fs and the other-cell interference ratio fo may fluctuate according to operational conditions of the system, installation conditions of the base station or fluctuation in traffic with time.

This embodiment deals with fluctuation in (fs+fo) as this. When the above equation (2) is modified, the following equation (4) is given.

$$(fs + fo) \approx K \times \frac{pg}{Eb/No \times N} \quad (4)$$

In the equation (4), N is the number of accommodated channels (ch/sector/FR), pg is a processing gain, Eb/No is an actual Eb/No, and K is a coefficient representing an effect of other parameters. Since K and pg are values determined when operational conditions of the system and the like are determined, it is possible to know (fs+fo) when the number of channels K and the actual signal quality Eb/No are determined.

The number of channels N is generally a quantity monitored at all times for charging or the like. Eb/No can be readily determined by measuring an error rate or a received power of received data. Accordingly, it is possible to determine an optimum switching speed threshold value under conditions of the actual system operation by beforehand measuring the number of channels and Eb/No in the operational environments of the system or under installation conditions of the base station, calculating (fs+fo), and making a graph corresponding to FIG. 7 using the value.

Figure 8:
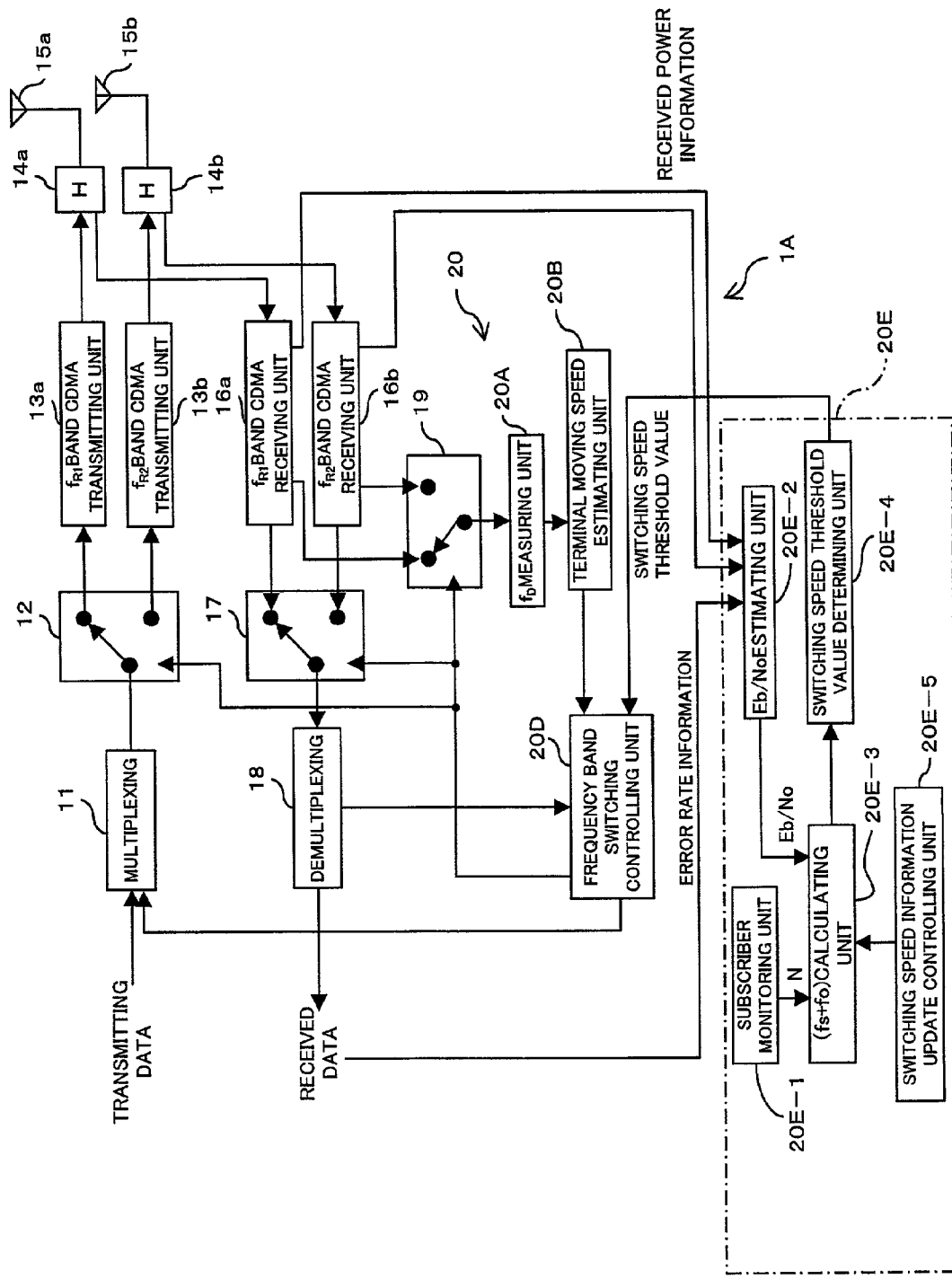
FIG. 8 is a block diagram showing a structure of a radio base station apparatus according to a second modification of this embodiment.

FIG. 8 shows a structure of a base station 1A in this case. A structure of the terminal 2 is similar to that shown in FIGS. 1 and 4. Dissimilarly to the base station 1 shown in FIG. 1, the base station 1A according to this modification comprises, in the controlling system 20, a switching speed threshold value processing unit 20E including a subscriber monitoring unit 20E-1, an Eb/No estimating unit 20E-2, an (fs+fo) calculating unit 20E-3, a switching speed threshold value determining unit 20E-4 and a switching speed information update controlling unit 20E-5. Incidentally, other structural elements have similar functions shown in FIG. 1 when not specifically mentioned.

The subscriber monitoring unit 20E-1 monitors the number of channels (the number of subscribers) during communication, which can be realized using a channel monitoring function for charging or the like as described above, for example. The Eb/No estimating unit 20E-2 estimates an actual Eb/No in each radio frequency band on the basis of error rate information on a received signal and received power information on a received signal in each radio frequency band (the fR1 band, the fR2 band).

The (fs+fo) calculating unit (interference power ratio information calculating unit) 20E-3 carries out calculation for each radio frequency band using the above equation (4) on the basis of the number of channels N monitored by the subscriber monitoring unit 20E-1 and an actual measured value of Eb/No obtained by the Eb/No estimating unit 20E-2 to calculate interference power ratio information (fs+fo) on each radio frequency band. The switching speed threshold value determining unit 20E-4 makes a graph corresponding to FIG. 7 on the basis of a result (fs+fo) of the calculation by the (fs+fo) calculating unit 20E-3 to determine an optimum switching speed threshold value under actual operational conditions of the system.

The switching speed information update controlling unit 20E-5 applies a start trigger to the (fs+fo) calculating unit 20E-3 at predetermined cycles to make the (fs+fo) calculating unit 20E-3 calculate (fs+fo) at predetermined cycles.

With such the structure of the base station, the system according to this modification can again calculate an optimum switching speed threshold value, following fluctuation, even when a value of the self(same)-cell interference ratio fs or the other-cell interference ratio fo fluctuates due to the fluctuation in operational environments of the system, in installation conditions of the base station or in traffic with time, thereby realizing a suitable frequency band switching in consideration of fluctuation or the like in actual operational environments of the system, in installation conditions of the base station or in traffic with time. Accordingly, it is possible to largely improve the communication quality and increase the channel capacity.

(D) Third Modification

According to the above embodiment and modifications, the use radio frequency band is switched at one switching speed threshold value (hereinafter simply referred as "threshold value"). For this, when there is deviation in the terminal moving speed, there is a possibility that a phenomenon that one radio frequency band (the fR1 band or the fR2 band) is more frequently selected is generate. According to this modification, there are prepared a plurality of threshold values to alleviate concentration of calls in a specific frequency band.

Figure 9:
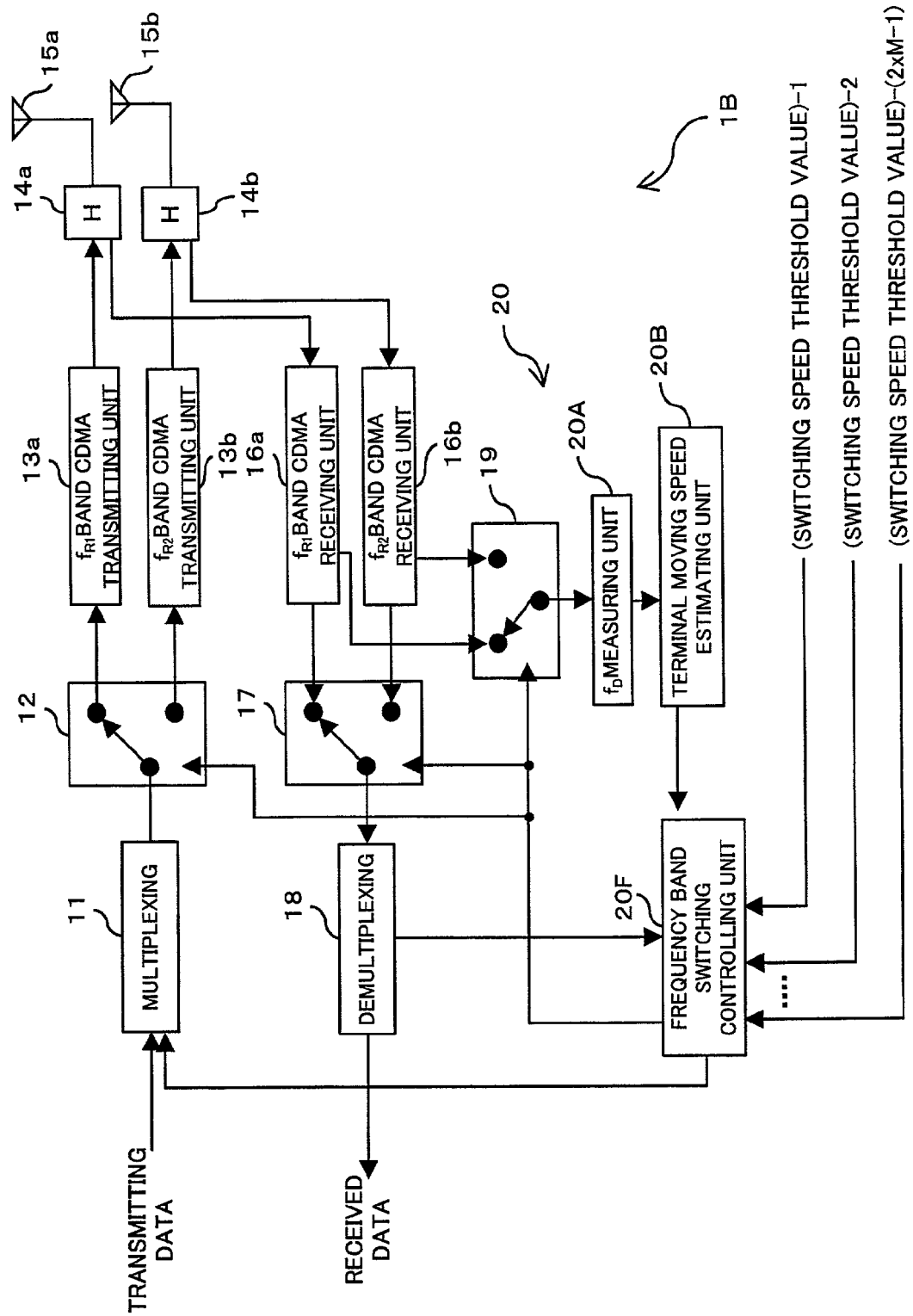
FIG. 9 is a block diagram showing a structure of a radio base station apparatus according to a third modification of this embodiment.

FIG. 9 shows a structure of a base station 1B according to a third modification. Incidentally, a structure of the terminal 2 according to this modification is similar to that shown in FIGS. 1 and 4. Unlike the base station 1 shown in FIG. 1, the base station 1B according to this modification is provided with a frequency band switching controlling unit 20F which accepts a plurality (2×M−1) of threshold values, in lieu of the frequency band switching controlling unit 20D.

Figure 10:
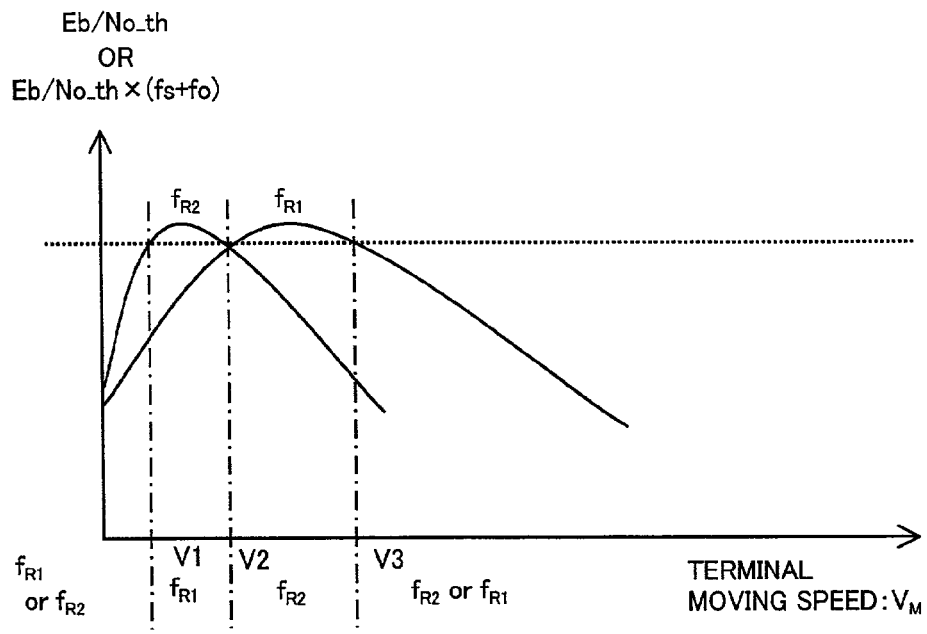
FIG. 10 is a diagram for illustrating a manner of setting a plurality of switching speed threshold values (when M=2) in the radio base station apparatus shown in FIG. 9.

When M=2, that is, when two frequency bands fR1 and fR2 (fR1<fR2) are prepared, three threshold values V1, V2 and V3 are set as the above threshold value, as shown in FIG. 10. V1 is a terminal moving speed at which Eb/No is at the worst value in the above embodiment and modifications, V2 is a terminal moving speed at which Eb/No_th is at the same value as when the terminal moving speed is V1 in the case where the fR2 band is used, and V3 is a terminal moving speed at which Eb/No th is at the same value as when the terminal moving speed is V2 in the case where the fR1 band is used.

In this case, the frequency band switching controlling unit 20F such controls the change-over switches 12, 17 and 19 to use the fR1 band or the fR2 band (using fR1 in preference) when VM≦V1 where the terminal moving speed is VM, use the fR1 band when V1<VM≦2V, use the fR2 band when V2<VM≦V3, and use the fR2 band or the fR1 band (using the fR2 band in preference) when V3<VM.

Namely, the frequency band switching controlling unit 20F has a function as a determining unit which compares a terminal moving speed detected by the terminal moving speed estimating unit 20A with each of (2×M−1) threshold values, and determines which range of threshold value the terminal moving speed falls in. The radio frequency band is selected on the basis of a result of determination by the determining unit and priority information defining which radio frequency band should be used for each of plural terminal speed ranges defined by the threshold values.

Figure 12:
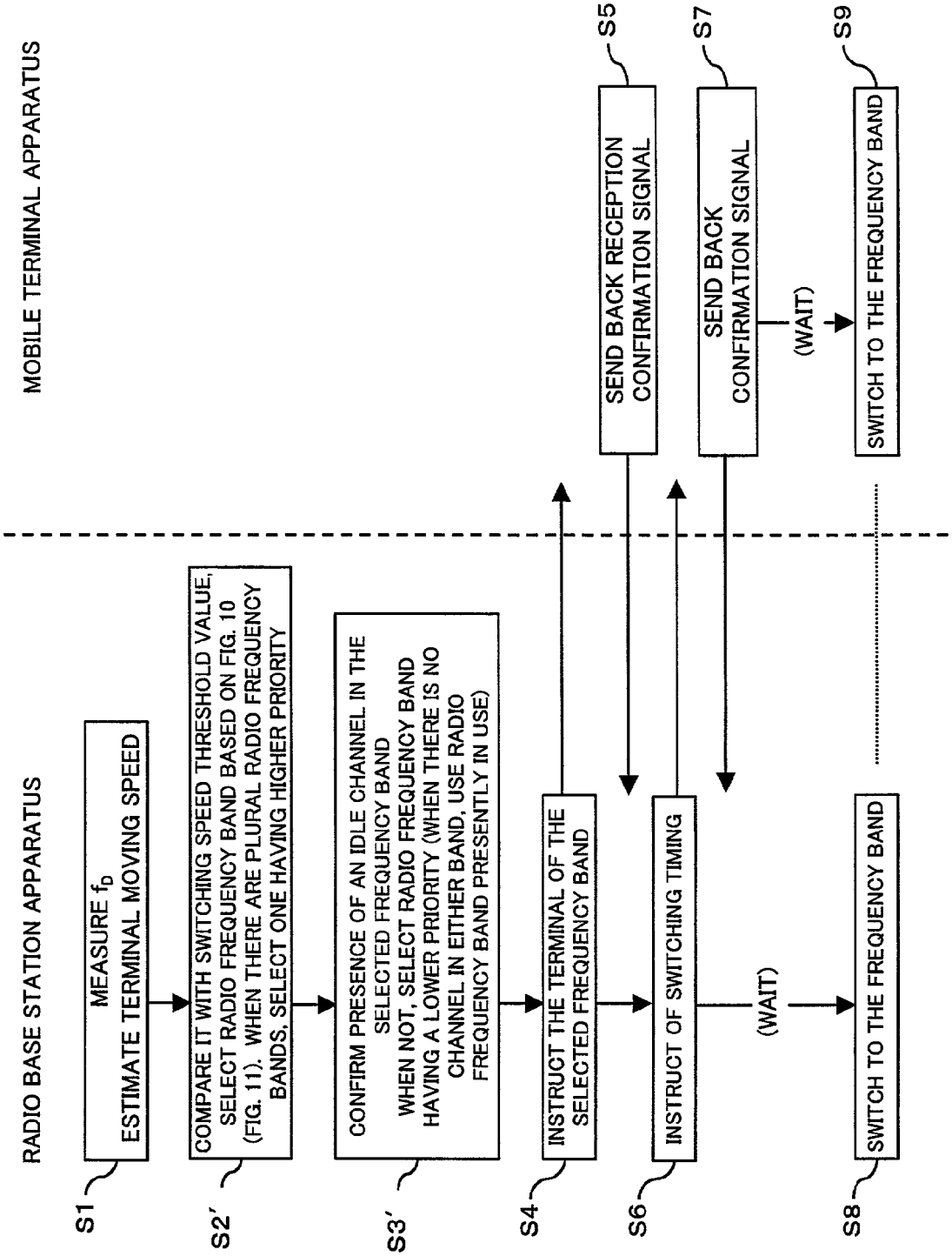
FIG. 12 is a sequence diagram for illustrating an operation of a CDMA communication system according to the third modification.

A sequence for switching the use radio frequency band between the base station 1B and the terminal 2 is as shown in FIG. 12. In the base station 1B, the Doppler frequency measuring unit 20A measures the Doppler frequency fD on the basis of a received signal, and the terminal moving speed estimating unit 20B determines a moving speed of the terminal 2 on the basis of the Doppler frequency fD (step S1). Incidentally, either the fR1 and fR2 bands may be used in the communication between the base station 1 and the terminal 2 at this time. However, it is desirable to use the lower frequency band (the fR1 band in this embodiment) in the initial state.

In the base station 1B, the frequency band switching controlling unit 20F compares the terminal moving speed determined by the terminal moving speed estimating unit 20B with the threshold value at predetermined cycles. And, the frequency band switching controlling unit 20F selects a use radio frequency band under the above conditions (which range of the threshold value V1, V2 or V3 VM falls in) shown in FIG. 10. At this time, when there are a plurality of selectable radio frequency bands, the frequency band switching controlling unit 20F selects one having a higher priority (step S2'). When radio frequency bands before and after the selection are the same, selection of a radio frequency band used up to that time is kept, as well.

The frequency band switching controlling unit 20F confirms whether there is an idle channel in the selected frequency band. When there is an idle channel, the frequency band switching controlling unit 20F notifies the terminal 2 of the selected frequency band with a control signal (selected frequency notification signal). When there is no idle channel, the frequency band switching controlling unit 20F selects a frequency band having a lower priority, confirms presence of an idle channel in the similar manner, and notifies the terminal 2 of the selected frequency band with a selected frequency notification signal. When there is no idle channel in any selectable frequency band, a frequency band presently in use is continuously used (steps S3' and S4). In this case, a frequency band presently in use may be newly notified to the terminal 2 with a selected frequency notification signal, or this notification may be omitted.

After that, the base station 1B and the terminal 2 exchange a reception confirmation signal, a switching timing instruction signal and a confirmation signal in the similar manner shown in FIG. 6, together wait for a timing defined by the switching timing instruction signal, and simultaneously switch the use radio frequency band to a selected radio frequency band (steps S5 to S9). When the radio frequency bands before and after the switching are the same, a radio frequency band used up to that time is kept as a result, as well. Synchronization of the switching timing may be established in another manner.

With a plurality of threshold values, the use radio frequency band is selected and given a priority according to which range of threshold value the terminal moving speed falls in, as above. It is thereby possible to alleviate concentration of calls in a specific frequency band without degrading the worst value of Eb/No_th, similarly to the above embodiment.

Figure 11:
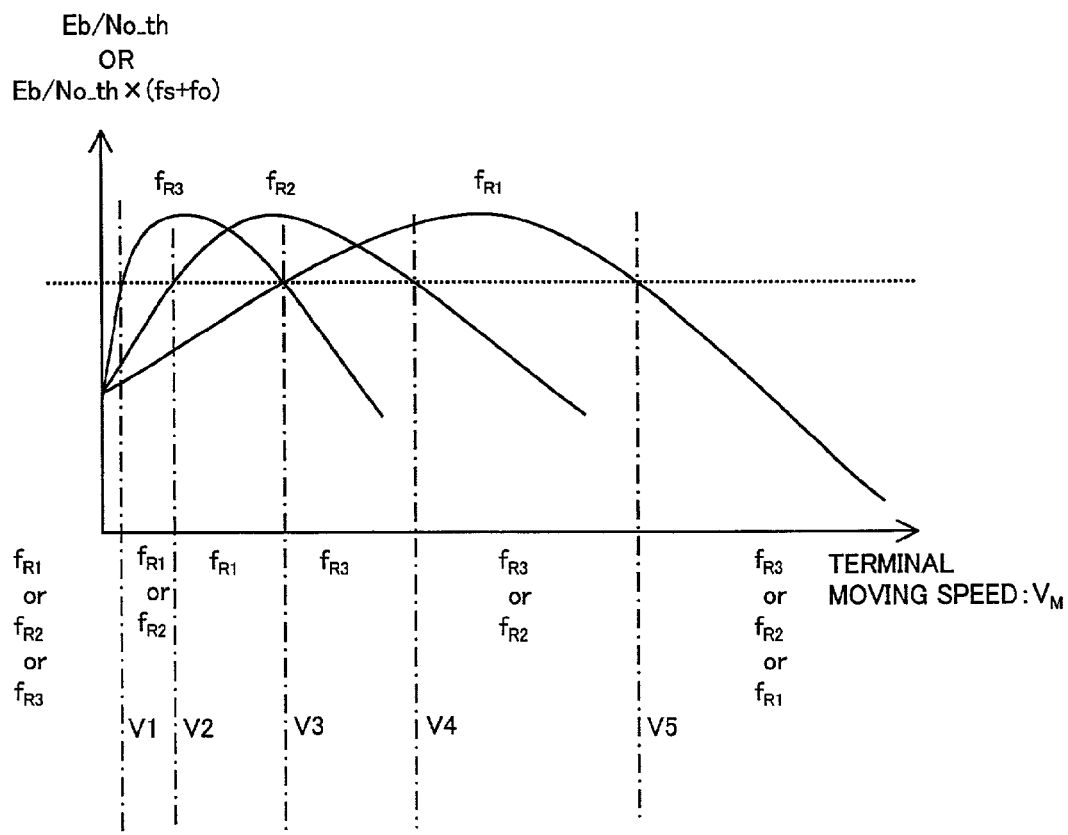
FIG. 11 is a diagram for illustrating a manner of setting a plurality of switching speed threshold values (when M=3) in the radio base station apparatus shown in FIG. 9.

When M=3, that is, when three frequency bands fR1, fR2 and fR3 are prepared, five threshold values V1–5 are set as shown in, for example, shown in FIG. 11. When VM≦V1, the fR1 band, the fR2 band or the fR3 band is used (preferentially in order of the fR1 band and the fR2 band). When V1<VM≦V2, the fR1 band or the fR2 band is used (fR1 being preferentially used). When V2<VM≦V3 , the fR1 band is used. When V3<VM≦V4, the fR3 band is used. When V4<VM≦V5, the fR3 band or the fR2 band is used (preferentially the fR3 band). When V5<VM, the fR1 band, the fR2 band or the fR3 band is used (preferentially in order of the fR3 band and the fR2 band). This is the same when M>3.

Even when a plurality of threshold values are prepared, as this modification, it is possible to determine each threshold value on the basis of Eb/No_th×(fs+fo) to a terminal moving speed as described with reference to FIG. 7, calculate an other-cell interference ratio fo adding a change in another wave propagation parameter (for example, refer to the reference 3) such as a distance attenuation parameter to the radio frequency band or the like, or sequentially update values of the self-cell interference ratio fs and the other-cell interference ratio fo according to fluctuation in operational environments of the system, in installation conditions of the base station or in traffic with time, similarly to the first and second modifications. In any case, a larger effect of improvement of the communication quality and channel capacity is expected while concentration of calls in a specific frequency band is prevented.

(E) Others

In the above embodiment and modifications, a terminal moving speed itself is detected as information about a terminal moving speed from the Doppler frequency fD. However, the Doppler frequency fD (fading pitch (cycle)) information) itself may be used to set a threshold value for the information. In such case, the similar functions and effects can be provided, of course.

In the above embodiment and modifications, the base station 1 estimates a state of reception (terminal moving speed or fading cycle) of a signal on forward link in the terminal 2 on the basis of a received signal (signal on reverse link) from the terminal 2, and switches the use frequency band. Alternatively, the terminal 2 may notify the base station 1 of an actual state of reception (terminal moving speed or fading cycle) of the terminal 2, whereby the base station 1 determines whether the fading cycle or the terminal moving speed in the received signal on forward link received by the terminal 2 is fast or slow to switch the frequency in the above manner.

In the above embodiment and modifications, the switching speed threshold value is set to a speed corresponding to an intersection of the required Eb/No characteristics of the radio frequency bands. Alternatively, it is possible to select, as the use frequency, a frequency belonging to at least the 2-GHz band when the terminal moving speed is below a speed at which the tendency of the required Eb/No characteristic 31 in the 850-MHz band changes in, for example, FIG. 5, or select, as the use frequency, a frequency belonging to the 850-MHz band when the terminal moving speed is not slower than a speed at which the tendency of the required Eb/No characteristic 32 in the 2-GHz band changes.

Note that the present invention is not limited to the above examples, but may be modified in various ways without departing from the scope of the invention.

What is claimed is:

1. A mobile communication system having a radio base station and a mobile terminal being able to communicate with said radio base station using a specific radio frequency band comprising:

a detecting unit to detect speed information concerning a moving speed of said mobile terminal on the basis of a received signal from said mobile terminal; and a selection controlling unit to select a use frequency in a higher radio frequency band when said speed information detected by said detecting unit is higher, select a use frequency in a lower radio frequency band when said speed information is lower, and assign said selected use frequency to the communication between said mobile terminal and said radio base station; and a confirmation signal extracting unit to extract a confirmation signal from a received signal from said mobile terminal, said confirmation signal confirming said mobile terminal received notification of said selected use frequency for communication between said mobile terminal and said radio base station, said confirmation signal useful in timing the transition to said selected use frequency.

2. A radio base station being able to communicate with a mobile terminal using a specific frequency band comprising:

a radio communicating unit being able to communicate with said mobile terminal using any one of a plurality of radio frequency bands;

a speed information detecting unit to detect speed information concerning a moving speed of said mobile terminal on the basis of a received signal from said mobile terminal received by said radio communicating unit;

a use frequency selection controlling unit to select a use frequency in a higher radio frequency band when said speed information detected by said speed information detecting unit is higher, select a use frequency in a lower radio frequency band when said information is lower, and assign said selected use frequency to the communication with said mobile terminal; and a confirmation signal extracting unit to extract a confirmation signal from a received signal from said mobile terminal, said confirmation signal confirming said mobile terminal received notification of said selected use frequency for communication between said mobile terminal and said radio base station, said confirmation signal useful in timing the transition to said selected use frequency.

3. The radio base station according to claim 2, wherein a threshold value information about said speed information, which represents a boundary between said higher speed and said lower speed, is determined on the basis of interference power information with communication with said mobile terminal.

4. The radio base station according to claim 2, wherein said use frequency selection controlling unit comprises:

a notification signal generating unit to generate a selected frequency notification signal for notifying said mobile terminal of the selected use frequency; and a switching timing instruction signal generating unit to generate a switching timing instruction signal for instructing said mobile terminal of a switching timing to the selected use frequency when receiving said confirmation signal in response to said selected frequency notification signal from said mobile terminal;

said radio communicating unit comprises;

a control signal adding unit to add said selected frequency notification signal generated by said notification signal generating unit or said switching timing instruction signal generated by said switching timing instruction signal generating unit to a transmitting signal to said mobile terminal; and said confirmation signal extracting unit transmitting said confirmation signal to said switching timing instruction signal generating unit of said use frequency selection controlling unit.

5. The radio base station according to claim 2, wherein said use frequency selection controlling unit comprises a determining unit to compare said speed information detected by said speed information detecting unit with each of a plurality of pieces of threshold value information about said speed information to determine which range of said threshold value information said speed information falls in;

said use frequency selection controlling unit selects said use frequency on the basis of a result of determination by said determining unit, and priority information for deciding which radio frequency band should be used for each of a plurality of terminal speed ranges defined by said threshold value information.

6. The radio base station according to claim 3, wherein said interference power information is determined on the basis of a signal transmission characteristic of each of said radio frequency bands.

7. The radio base station according to claim 3, wherein said use frequency selection controlling unit comprises:

a monitoring unit to monitor information about the number of mobile terminals presently in communication;

a received signal-to-noise power ratio estimating unit to determine a measured value of a received signal-to-noise power ratio on the basis of a signal received from said mobile terminal by said radio communicating unit; and an interference power ratio information calculating unit to calculate said interference power information on the basis of said information about the number of mobile terminals monitored by said monitoring unit and said measured value of said received signal-to-noise power ratio.

8. The radio base station according to claim 3, wherein said use frequency selection controlling unit comprises:

a notification signal generating unit to generate a selected frequency notification signal for notifying said mobile terminal of the selected use frequency; and a switching timing instruction signal generating unit to generate a switching timing instruction signal for instructing said mobile terminal of a switching timing to the selected use frequency when receiving said confirmation signal in response to said selected frequency notification signal from said mobile terminal;

said radio communicating unit comprises;

a control signal adding unit to add said selected frequency notification signal generated by said notification signal generating unit or said switching timing instruction signal generated by said switching timing instruction signal generating unit to a transmitting signal to said mobile terminal; and said confirmation signal extracting unit transmitting said confirmation signal to said switching timing instruction signal generating unit of said use frequency selection controlling unit.

9. The radio base station according to claim 3, wherein said use frequency selection controlling unit comprises a determining unit for comparing said speed information detected by said speed information detecting unit with each of a plurality of pieces of threshold value information about said speed information to determine which range of said threshold value information said speed information falls in;

said use frequency selection controlling unit selects said use frequency on the basis of a result of determination by said determining unit, and priority information for deciding which radio frequency band should be used for each of a plurality of terminal speed ranges defined by said threshold value information.

10. The radio base station according to claim 6, wherein said use frequency selection controlling unit comprises:

a monitoring unit to monitor information about the number of mobile terminals presently in communication;

a received signal-to-noise power ratio estimating unit to determine a measured value of a received signal-to-noise power ratio on the basis of a signal received from said mobile terminal by said radio communicating unit; and an interference power ratio information calculating unit to calculate said interference power information on the basis of said information about the number of mobile terminals monitored by said monitoring unit and said measured value of said received signal-to-noise power ratio.

11. The radio base station according to claim 6, wherein said use frequency selection controlling unit comprises:

a notification signal generating unit to generate a selected frequency notification signal for notifying said mobile terminal of the selected use frequency; and a switching timing instruction signal generating unit to generate a switching timing instruction signal for instructing said mobile terminal of a switching timing to the selected use frequency when receiving said continuation signal in response to said selected frequency notification signal from said mobile terminal;

said radio communicating unit comprises;

a control signal adding unit to add said selected frequency notification signal generated by said notification signal generating unit or said switching timing instruction signal generated by said switching timing instruction signal generating unit to a transmitting signal to said mobile terminal; and said confirmation signal extracting unit transmitting said confirmation signal to said switching timing instruction signal generating unit of said use frequency selection controlling unit.

12. The radio base station according to claim 6, wherein said use frequency selection controlling unit comprises a determining unit for comparing said speed information detected by said speed information detecting unit with each of a plurality of pieces of threshold value information about said speed information to determine which range of said threshold value information said speed information falls in;

said use frequency selection controlling unit selects said use frequency on the basis of a result of determination by said determining unit, and priority information for deciding which radio frequency band should be used for each of a plurality of terminal speed ranges defined by said threshold value information.

13. The radio base station according to claim 10, wherein said use frequency selection controlling unit comprises:

a notification signal generating unit to generate a selected frequency notification signal for notifying said mobile terminal of the selected use frequency; and a switching timing instruction signal generating unit to generate a switching timing instruction signal for instructing said mobile terminal of a switching timing to the selected use frequency when receiving said confirmation signal in response to said selected frequency notification signal from said mobile terminal;

said radio communicating unit comprises;

a control signal adding unit to add said selected frequency notification signal generated by said notification signal generating unit or said switching timing instruction signal generated by said switching timing instruction signal generating unit to a transmitting signal to said mobile terminal; and said confirmation signal extracting unit transmitting said confirmation signal to said switching timing instruction signal generating unit of said use frequency selection controlling unit.

14. The radio base station according to claim 10, wherein said use frequency selection controlling unit comprises a determining unit for comparing said speed information detected by said speed information detecting unit with each of a plurality of pieces of threshold value information about said speed information to determine which range of said threshold value information said speed information falls in;

said use frequency selection controlling unit selects said use frequency on the basis of a result of determination by said determining unit, and priority information for deciding which radio frequency band should be used for each of a plurality of terminal speed ranges defined by said threshold value information.

15. The radio base station according to claim 13, wherein said use frequency selection controlling unit comprises a determining unit far comparing said speed information detected by said speed information detecting unit with each of a plurality of pieces of threshold value information about said speed information to determine which range of said threshold value information said speed information fails in;

said use frequency selection controlling unit selects said use frequency on the basis of a result of determination by said determining unit, and priority information for deciding which radio frequency band should be used for each of a plurality of terminal speed ranges defined by said threshold value information.

16. A radio base station employing a communication system having a characteristic that a required signal-to-noise power ratio of a received signal in a mobile terminal changes from a tendency to increase to a tendency to decrease according to a moving speed of said mobile terminal, said radio base station comprising:

a radio communicating unit being able to communicate with said mobile terminal using both a frequency belonging to a first frequency band and a frequency belonging to a second frequency band higher than said first frequency band;

a speed information detecting unit to detect information concerning a moving speed of said mobile terminal from a signal received from said mobile terminal;

a use frequency selection controlling unit to at least select a frequency belonging to said second frequency band as the use frequency in said radio communication unit when said information detected by said speed information detecting unit is not higher than information at which said tendency of said characteristic in said first frequency band changes, select a frequency belonging to said first frequency band as the use frequency in said radio communicating unit when said information detected by said speed information detecting unit is not lower than speed information at which said tendency of said characteristic in said second frequency band changes; and a confirmation signal extracting unit to extract a confirmation signal from a received signal from said mobile terminal, said confirmation signal confirming said mobile terminal received notification of said selected use frequency for communication between said mobile terminal and said radio base station, said confirmation signal useful in timing the transition to said selected use frequency.

17. A radio apparatus being able to use both a frequency belonging to a first frequency band and a frequency belonging to a second frequency band higher than said first frequency band for communication on forward and reverse links with a mobile terminal, said radio apparatus comprising:
- a transmitting unit to convert a signal obtained by error-correction-encoding and interleave transmitting data into a radio signal, and transmit said radio signal for communication on the forward link to said mobile terminal;
- a transmitting power controlling unit to control a transmitting power of said radio signal for communication on the forward link on the basis of a received signal from said mobile terminal;
- a selection controlling unit to use a frequency belonging to said second frequency band for communication with said mobile terminal when determining that a fading cycle of the received signal from said mobile terminal or a moving speed of said mobile terminal is fast, use a frequency belonging to said first frequency band for communication with said mobile terminal when determining that said fading cycle or said moving speed of said mobile terminal is slow; and
- a confirmation signal extracting unit to extract a confirmation signal from a received signal from said mobile terminal, said confirmation signal confirming said mobile terminal received notification of said selected use frequency for communication between said mobile terminal and said radio apparatus, said confirmation signal useful in timing the transition to said selected use frequency.

18. A radio apparatus being able to use both a frequency belonging to a first frequency band and a frequency belonging to a second frequency band higher than said first frequency band for communication on forward and reverse links with a mobile terminal, said radio apparatus comprising:
- a transmitting unit to convert a signal obtained by encoding and interleaving transmitting data into a radio signal, and transmit said radio signal for communication on the forward link to said mobile terminal;
- a transmitting power controlling unit to control a transmitting power of said radio signal for communication on the forward link on the basis of a received signal from said mobile terminal;
- a selection controlling unit to use a frequency belonging to said second frequency band in communication with said mobile terminal when determining on the basis of said received signal from said mobile terminal that a fading cycle in a received signal on the forward link received by said mobile terminal or a moving speed of said mobile terminal is fast, use a frequency belonging to said first frequency band in communication with said mobile terminal when determining that said fading cycle or said moving speed of said mobile terminal is slow; and
- a confirmation signal extracting unit to extract a confirmation signal from a received signal from said mobile terminal, said confirmation signal confirming said mobile terminal received notification of said selected use frequency for communication between said mobile terminal and said radio base station, said confirmation signal useful in timing the transition to said selected use frequency.

19. A mobile terminal being able to communicate with a radio base station using a specific radio frequency band comprising:
- a radio communicating unit being able to communicate with said radio base station using any one of a plurality of radio frequency bands;
- a selected frequency notification signal receiving unit to receive, from said radio communicating unit, a selected frequency notification signal for notifying of a use frequency selected among higher radio frequency bands in said radio base station when speed information of its own is faster or selected among lower radio frequency bands when the speed information of its own is slower;
- a use frequency selection controlling unit to select a radio frequency to be used in said radio communicating unit among said radio frequency bands according to said selected frequency notification signal received by said selected frequency notification signal receiving unit; and
- a confirmation signal transmitting unit to transmit a confirmation signal in response to said selected frequency notification signal to said radio base station.

20. The mobile terminal according to claim 19 further comprising:
- a switching timing instruction signal receiving unit to receive a switching timing instruction signal as a response to said confirmation signal from said radio base station;
- said use frequency selection controlling unit to execute a switching to a radio frequency notified by said selected frequency notification signal at a timing defined by said switching timing instruction signal received by said switching timing instruction signal receiving unit.

* * * * *